United States Patent
Hirata et al.

(10) Patent No.: US 8,313,199 B2
(45) Date of Patent: *Nov. 20, 2012

(54) PROJECTION DISPLAY SYSTEM INCLUDING LENS GROUP AND REFLECTING MIRROR

(75) Inventors: Koji Hirata, Yokohama (JP); Masahiko Yatsu, Fujisawa (JP); Takanori Hisada, Yokohama (JP); Masayuki Ohki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 645 days.

This patent is subject to a terminal disclaimer.

(21) Appl. No.: 11/871,438

(22) Filed: Oct. 12, 2007

(65) Prior Publication Data
US 2008/0212038 A1  Sep. 4, 2008

(30) Foreign Application Priority Data
Oct. 13, 2006 (JP) .................................. 2006-279926

(51) Int. Cl.
*G03B 21/26* (2006.01)
*G03B 21/56* (2006.01)
*G02B 3/00* (2006.01)

(52) U.S. Cl. .......... 353/94; 359/460; 359/461; 359/649; 359/650

(58) Field of Classification Search .................. 359/460, 359/461, 649–651; 353/94
See application file for complete search history.

(56) References Cited

U.S. PATENT DOCUMENTS

| 5,926,153 | A | 7/1999 | Ohishi et al. | |
| 6,866,388 | B2 * | 3/2005 | Yang | 353/70 |
| 7,090,354 | B2 * | 8/2006 | Engle et al. | 353/70 |
| 7,586,687 | B2 * | 9/2009 | Yoshikawa et al. | 359/649 |
| 8,002,417 | B2 * | 8/2011 | Hisada et al. | 353/70 |
| 2004/0156117 | A1 | 8/2004 | Takaura et al. | |
| 2005/0117126 | A1 | 6/2005 | Miyazawa et al. | |
| 2006/0227299 | A1 * | 10/2006 | Hisada et al. | 353/77 |
| 2006/0227432 | A1 | 10/2006 | Yoshikawa et al. | |

FOREIGN PATENT DOCUMENTS

| EP | 1 211 541 | 6/2002 |
| JP | 04-263237 | 9/1992 |
| JP | 05-134213 | 5/1993 |
| JP | 10-312024 | 11/1998 |
| JP | 2000-162544 | 6/2000 |
| JP | 2001-264627 | 9/2001 |
| JP | 2003-177466 | 6/2003 |
| JP | 2004-085752 | 3/2004 |
| JP | 2004085752 A * | 3/2004 |
| JP | 2004-157560 | 6/2004 |

(Continued)

*Primary Examiner* — Thanh Luu
*Assistant Examiner* — Danell L Owens
(74) *Attorney, Agent, or Firm* — Antonelli, Terry, Stout & Kraus, LLP.

(57) ABSTRACT

A projection display system comprising a projection display unit including a light source, an image display element, a lighting optical system irradiating a beam of light on the image display element, and a projection optical system projecting an image light from the image display element toward a screen. The projection optical system including a lens group composed of a plurality of lens elements arranged in order toward the screen from the image display element and symmetrically with respect to an optical axis, and a reflecting mirror shaped to be axial-asymmetrical with respect to the optical axis. The projection display system further comprises a screen 5. The projection display unit projects the image light onto a projection plane of the screen to display an image.

18 Claims, 20 Drawing Sheets

FOREIGN PATENT DOCUMENTS

| | | |
|---|---|---|
| JP | 2004-247868 | 9/2004 |
| JP | 2004-312480 | 11/2004 |
| JP | 2005-80261 | 3/2005 |
| JP | 2006-292900 | 10/2006 |
| WO | WO 00/52526 | 9/2000 |
| WO | 2004/111699 | 12/2004 |
| WO | WO 2005/106560 | 11/2005 |
| WO | WO 2006/043666 | 4/2006 |

* cited by examiner

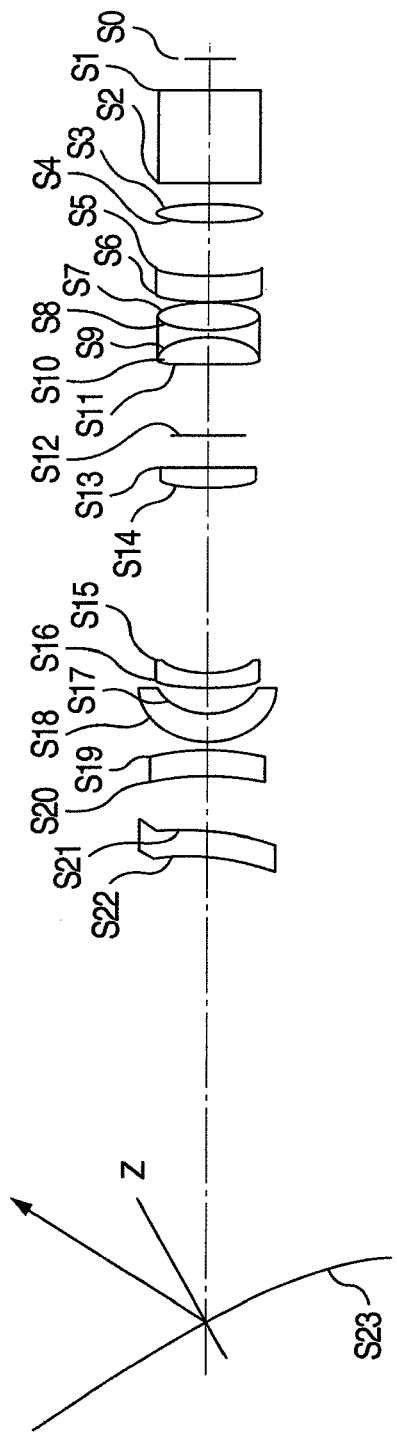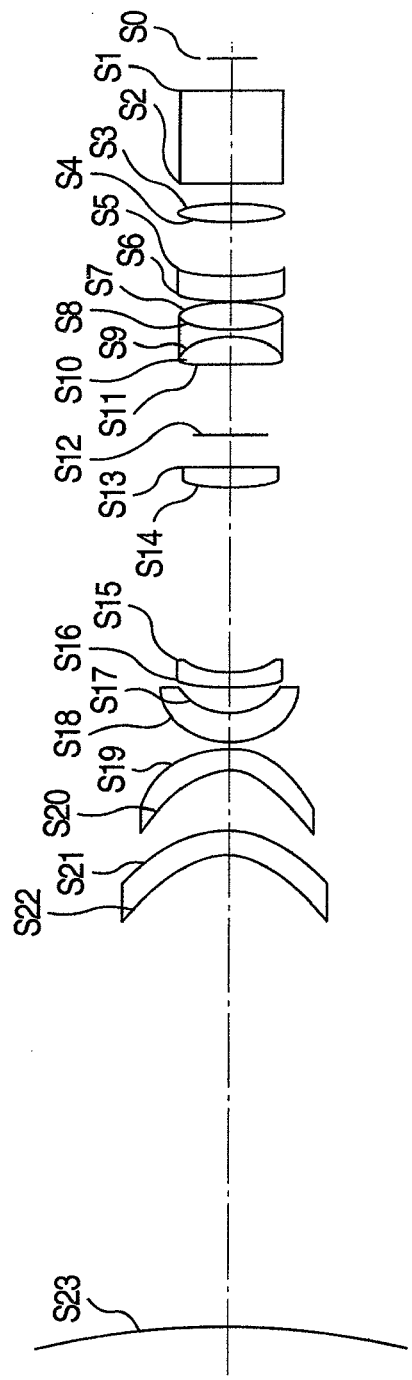

PROJECTION DISPLAY SYSTEM INCLUDING LENS GROUP AND REFLECTING MIRROR

INCORPORATION BY REFERENCE

The present application claims priority from Japanese application JP2006-279926 filed on Oct. 13, 2006, the content of which is hereby incorporated by reference into this application.

BACKGROUND OF THE INVENTION

1. Technical Field

The present invention relates to a projection display system, which magnifies an image of an image display element to project the same onto a surface of a screen, etc. to display the image, and more particular, to a projection display system suited to display an image on a large screen.

2. Related Art

Various kinds of color image projection display systems has been already known and put to practical use, which magnify and project an image of an image display element onto a screen (projection plane) through a projection optical unit composed of a plurality of lenses. Such display systems are required to get a magnified image having a sufficiently magnitude on a screen without distortion. In order to realize this, as described in, for example, JP-A-5-134213 and JP-A-2000-162544, there has been already known a projection unit or an optical system, which shifts a projection plane in a perpendicular direction in relation to an optical axis of a projection system, magnifies and projects an image onto a screen in an oblique direction with the use of an additional optical system, which is arranged to be inclined at a predetermined angle to the optical axis of the projection system. The additional optical system (afocal converter) referred herein to is an optical system acting to convert a magnitude of a projection image and serving to correct/decrease distortion of the image caused by projection onto a screen in an oblique direction to obtain a rectangular-shaped projected image.

There has been also known, for example, in JP-A-2004-157560, a reflection type imaging optical system, which magnifies and projects an image of a display element onto a screen (projection plane) with the use of a plurality of reflecting mirrors (reflection type optical elements) instead of the lenses (transmission optical elements).

SUMMARY OF THE INVENTION

When an image is projected onto a screen in an oblique direction, so-called trapezoidal distortion is generated on a projected image. In order to solve this problem, a projection optical unit described in JP-A-5-134213 is constructed such that an additional optical system (afocal converter) arranged on a side of the screen is made eccentric to suppress the trapezoidal distortion. However, the lens which constitutes such additional eccentric optical system is difficult to achieve an increase in angle of view. In order to obtain a projected image having a necessary magnifying power, it causes a problem that the whole unit becomes large in size (in particular, a length of the optical unit along an optical path becomes long) since a distance to the screen from a projection unit becomes large and a distance to a screen from a projection system also becomes large. Besides, an additional optical system having a large aperture is needed as the lens which constitutes such additional eccentric optical system, but this is correspondingly responsible for an increase in cost of the projection optical unit.

With a projection optical unit described in JP-A-2000-162544, an increase in angle of view is difficult to achieve in the same reason as in JP-A-5-134213, and lenses as used are required to be made eccentric individually, so that manufacturing thereof is difficult and an additional optical system having a large aperture is also needed, which is responsible for an increase in cost of the projection optical unit.

On the other hand, the reflection type imaging optical system described in JP-A-2004-157560 makes use of a reflection optical system (with reflecting mirrors) instead of a conventional transmission type imaging optical system (with lens system) to thereby inhibit the imaging optical system from being made large in size and achieve an increase in angle of view. Since eccentricity (deviation) at the reflecting mirror is large, however, it is especially difficult to arrange a plurality of reflecting mirrors in exact positions as well as at angles of inclination thereof in the unit and vibrations readily change the reflecting mirrors in angles of inclination, etc., so that there is a problem that manufacturing thereof is extremely difficult.

In view of the problems in the related art, the inventors of the present application have provided, in Japanese Patent Application No. 2006-166434, a projection display unit, in which an increase in angle of view can be achieved without an increase in outline of the unit and manufacture of which is relatively easy, and a technology suited to making a projection display unit itself compact in outline dimension without the need of a projection optical unit or an additional optical system having a large aperture and free from generation of trapezoidal distortion.

It is an object of the invention to adopt the projection display unit provided in the Japanese Patent Application No. 2006-166434 to provide a projection display system, which magnifies and projects an image of an image display element onto a projection plane such as screen, etc. to display the image and can display the image on a large screen without distortion.

The invention provides a projection display system comprising a projection display unit and a screen, the projection display unit projecting an image light onto a projection plane of the screen to display an image, wherein the projection display unit includes: a light source; a image display element; a lighting optical system which irradiates a beam of light from the light source on the image display element; and a projection optical system which projects the image light from the image display element toward the screen, the projection optical system including a lens group composed of a plurality of lens elements arranged in order toward the screen from the image display element and symmetrically with respect to an optical axis, and a reflecting mirror shaped to be axial-asymmetrical with respect to the optical axis, and wherein the projection display unit is arranged on a part of upper, lower, left or right side of the screen along one plane extending perpendicularly to the projection plane from the side.

According to the invention, in the projection display system described above, it is preferable that the projection display unit is joined mechanically to the screen. It is also preferable that the screen is a portable screen which can be folded up. It is further preferable that the screen is provided on a part thereof with a portable handle.

According to the invention, in the projection display system described above, the projection display unit is arranged substantially centrally of an upper side of the screen, and includes a mirror which reflects the image light from the projection display unit to lead the same to the projection plane of the screen. Alternatively, in the projection display system described above, the projection display unit is arranged substantially centrally of an upper side of the screen, and at least two or more projection display systems are arranged so that a projection plane of a screen of each projection display system forms not more than 180 degrees relative to a projection plane of an adjacent screen, and the projection display units project mutually different images onto the projection planes of adjacent screens. Alternatively, the projection display units can compose one image plane on the two or more screens from mutually different images projected onto the adjacent screens. That is, the different images projected on the two or more screens composes one image as a whole In order to attain the object, the invention also provides a projection display system comprising a projection display units and a screen, the projection display units projecting an image light onto a projection plane of the screen to display an image, wherein each projection display unit includes: a light source; an image display element; a lighting optical system which irradiates a beam of light from the light source on the image display element; and a projection optical system which projects the image light from the image display element toward the screen, the projection optical system including a lens group composed of a plurality of lens elements arranged in order toward the screen from the image display element and symmetrically with respect to an optical axis, and a reflecting mirror shaped to be axial-asymmetrical with respect to the optical axis, and wherein the projection display units are arranged in positions close to upper and lower or left and right sides of the screen on parts of the sides along a pair of planes extending perpendicularly to the projection plane from the sides.

According to the invention, in the projection display system described above, it is preferable that the pair of projection display units arranged on the upper and lower or left and right sides of the screen project the same image so that the images are mutually overlapped. Alternatively, it is preferable that the pair of projection display units arranged on the upper and lower or left and right sides of the screen project the same image onto the projection plane of the screen so that the images are mutually overlapped. Furthermore, it is preferable that the pair of projection display units arranged on the upper and lower or left and right sides of the screen project mutually different images onto the projection plane of the screen. It is preferable that the pair of projection display units arranged on the upper and lower sides of the screen are arranged in plural in a horizontal direction. Furthermore, it is preferable that the pair of projection display units arranged on the left and right sides of the screen are arranged in plural in a vertical direction.

Other objects, features and advantages of the invention will become apparent from the following description of the embodiments of the invention taken in conjunction with the accompanying drawings.

BRIEF DESCRIPTION OF THE DRAWINGS

FIG. 13A is a vertical, cross sectional view illustrating lens surfaces of the optical unit;

FIG. 13B is a horizontal, cross sectional view illustrating lens surfaces of the optical unit;

DETAILED DESCRIPTION OF THE INVENTION

Embodiments of the invention will be described below in detail with reference to the accompanying drawings.

A projection display system, according to the invention, details of which will be described below, fundamentally comprises a projection display unit 100, which projects an image light from an image display element, and a screen 5, by which an image light projected from the projection display unit is projected on a projection surface to display an image.

Figure 10:
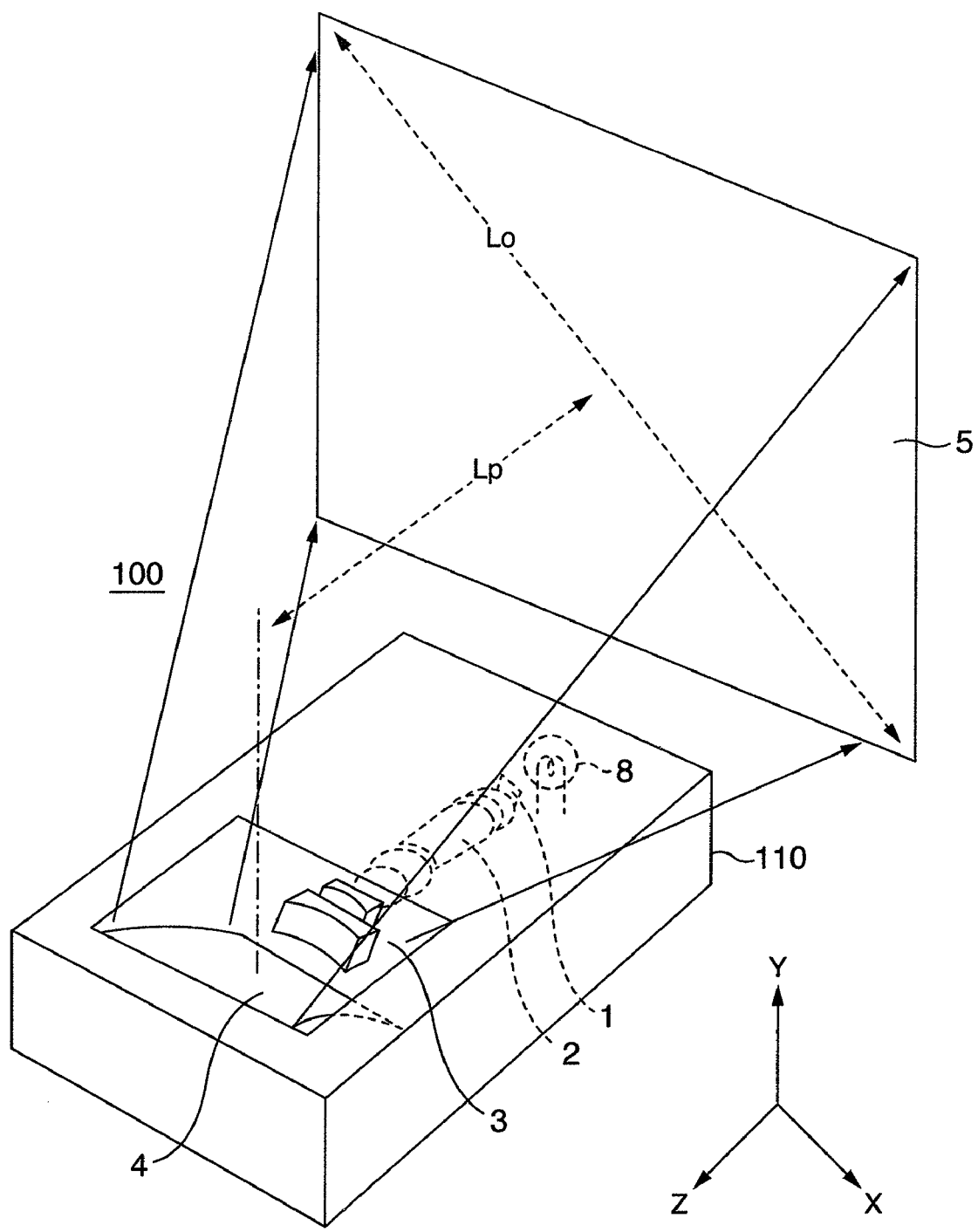
FIG. 10 is a view showing a whole configuration of a projection display unit in the projection display system according to the invention.

FIG. 10 is a perspective view showing a projection display unit, which constitutes the projection display system, according to an embodiment of the invention. That is, in the figure, a housing 110 constituting the projection display unit 100 includes therein an image display element 1, which displays an image or a projected image input from, for example, an external personal computer, and a light source 8, such as lamp, etc., which emits a white light with high luminance, and mounts thereon a projection optical unit, a construction of which will be described later in detail, and by which light irradiated from the light source 8 and modulated by the image display element 1 is magnified and irradiated. When the projection display unit is used indoor, a light outgoing from the projection display unit is projected onto a screen 5, such as sheet-shaped screen, etc. positioned in opposition to the housing 110 in one direction (longitudinal direction in the figure) and constituting a part of the projection display system as shown by an arrow in the figure.

Referring to a cross sectional view of FIG. 11, an explanation will be given to a fundamental, optical construction of the projection optical unit, which constitutes the projection display unit. In addition, the cross section of FIG. 11 indicates one as viewed from rightwardly downward in FIG. 10 (see a blank arrow in the figure) and corresponds to a Y-Z cross section in a X-Y-Z rectangular coordinate system (indicated by an arrow in the figure) shown in FIG. 11.

Figure 11:
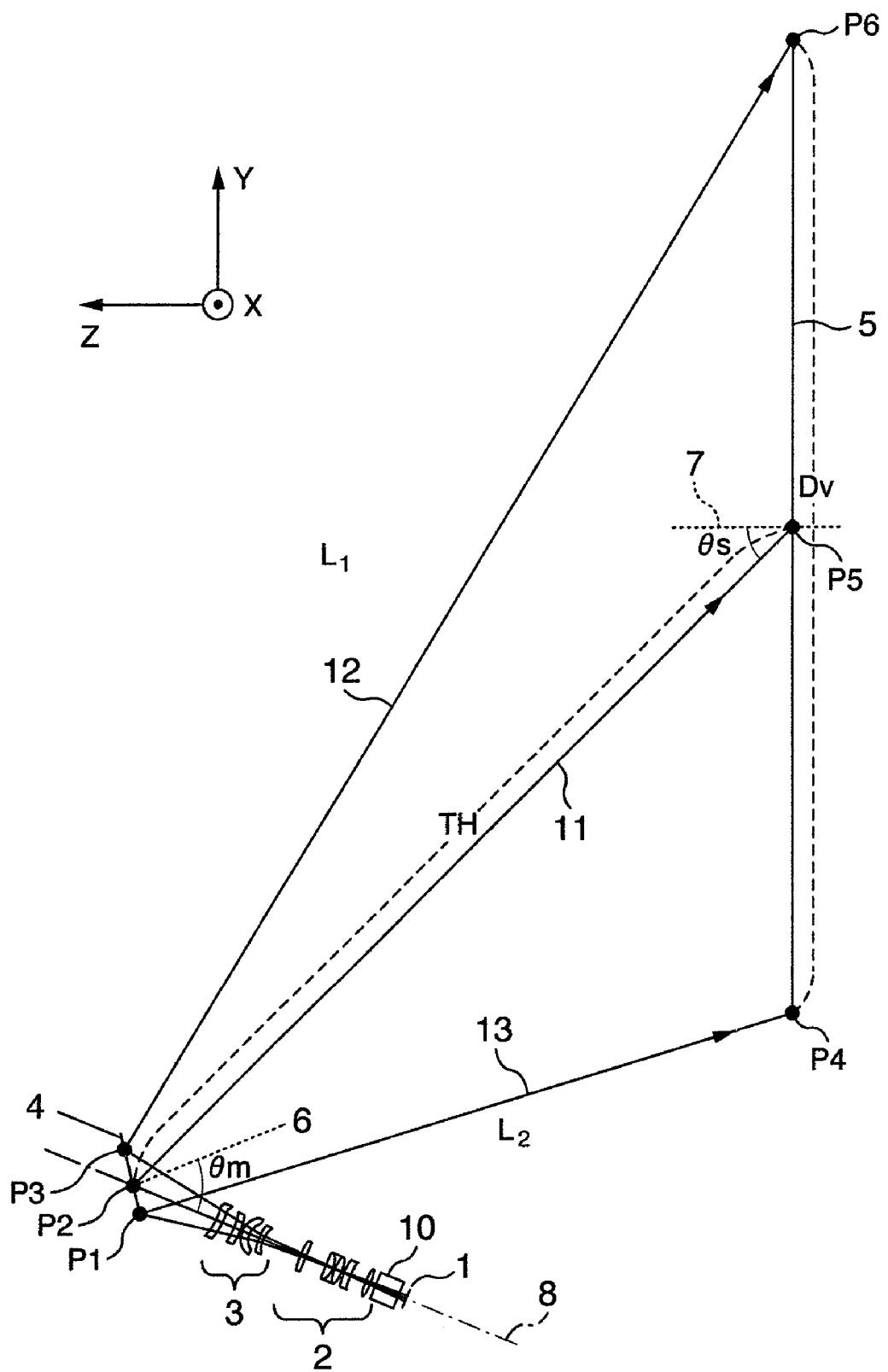
FIG. 11 is a view showing a fundamental configuration of a projection optical unit of the projection display unit.

As shown in FIG. 11, the projection optical unit includes the image display element 1, on which the light from the light source 8 is incident, a prism 10 which emits a desired projected image, a transmission (lens) optical system composed of two lens groups including a forward lens group 2 and a rear lens group 3, and a reflecting optical system including a reflecting mirror (referred below to as free-form surface mirror) having a reflecting surface, which is not of rotational symmetry (that is, rotational asymmetry) but is in the form of a free-form surface.

Here an example is shown, in which a transmission type one typified by, for example, a liquid crystal panel is adopted as the image display element 1, but the invention is not limited thereto but a self-luminescent type such as CRT will do. In the case where a transmission type one such as a liquid crystal panel, etc. is adopted as the image display element 1, there is a need for a lamp, which becomes the light source 8 to irradiate the liquid crystal panel. A system which composes a plurality of images R, G and B, such as three-plate type, will do, in which case there is a need for a prism, etc. for composing the images. Since details of the liquid crystal panel and a lamp, which become the light source 8 irradiating the liquid crystal panel, will be described later and are not related directly, however, depiction thereof is omitted. On the other hand, it is apparent that the light source 8 is not necessary in a self-luminescent type such as CRT.

With the projection optical unit constructed in a manner described above, light outgoing through the prism 10 from the image display element 1 is first incident on the forward lens group 2, which constitutes a lens optical system. In addition, the forward lens group 2, details of which will be described later, is constructed to comprise a plurality of refractive lenses having a surface configuration of rotational symmetry, positive power, and negative power. Thereafter, light outgoing from the forward lens group 2 passes the rear lens group 3 composed of a plurality (two in this example) of lenses having a free-form surface configuration, in which at least one surface is not of rotational symmetry (rotational asymmetry). Light outgoing from the rear lens group 3 is further magnified and reflected by a reflecting mirror 4 (referred below to as free-form surface mirror) having a reflecting surface of free-form surface configuration, which is not of rotational symmetry, and then projected onto the predetermined screen 5 (for example, a wall surface of a room, a sheet-shaped screen, etc.).

In addition, according to the embodiment, as apparent from FIG. 11, unlike an optical system in the related art (in particular, JP-A-5-134213 and JP-A-2000-162544 described above) in which a projected image plane (display element) is shifted vertically relative to an optical axis of the projection system and further an additional optical system is arranged to be inclined a predetermined angle to the optical axis of the projection system, the image display element 1 is arranged so that a center of a display image screen thereof is positioned substantially on an optical axis of the lens optical system (that is, forms a co-axial optical system). Accordingly, a light beam 11 (referred below to as "image-plane central light beam) outgoing from the center of the display image plane of the image display element 1 to pass a center of an entrance pupil of the lens optical system to be directed toward a center of an image plane on the screen 5 advances substantially along the optical axis of the lens optical system (including the forward lens group 2 and the rear lens group 3). Thereafter, the image-plane central light beam 11 is reflected at a point P2 on a reflecting surface 4 of the reflecting optical system (including the free-form surface mirror) having a free-form surface configuration and then is obliquely incident on a point P5 centrally of the image plane on the screen 5 from below a normal line 7 to the screen. This angle is referred below to as "oblique incident angle" and indicated by "θs". This means that the optical axis of the lens optical system is inclined substantially obliquely to the screen (an oblique incident system is provided), since a light beam passing along the optical axis of the lens optical system is incident obliquely on the screen.

As described above, when a light beam is incident obliquely on the screen, so-called trapezoidal distortion, in which a rectangular shape projected from the image display element 1 becomes trapezoidal in shape, and other various aberrations due to rotational asymmetry with respect to an optical axis are generated. However, these distortion and aberrations are corrected in the invention by the rear lens group 3 which constitutes the lens optical system, and the reflecting surface of the reflecting optical system.

In particular, since the reflecting surface of the reflecting mirror 4, which constitutes the reflecting optical system, magnifies and reflects a light beam projected from the image display element 1 to make the same incident obliquely on the screen 5, a large eccentricity (deflection angle) as compared with an eccentricity (deflection angle) of light obtained with a lens is obtained, and aberration is hard to be generated, so that it is possible to inhibit the unit from becoming large in size and to achieve an increase in angle of view. That is, the lens optical system including the forward lens group 2 and the rear lens group 3 can be made an optical system having a small aperture as compared with the construction, in which the additional optical system (afocal converter) of the related art (in particular, JP-A-5-134213 and JP-A-2000-162544 described above) is made eccentric to suppress a trapezoidal distortion.

Since the light incident on the reflecting surface of the reflecting mirror 4, which constitutes the reflecting optical system, is magnified to a predetermined magnitude and projected by the lens optical system, manufacturing thereof is made easy as compared with the conventional construction (for example, JP-A-157560 described above) in which a magnification projection system is constructed only by a reflecting mirror. Manufacture is especially suited to mass production by manufacturing the lens optical system separately from the reflecting optical system and then fixing and regulating positions of the both in the unit housing. As described above, since the construction, in which the rear lens group 3 is arranged forwardly of the forward lens group 2, enables an arrangement, in which a spacing between the rear lens group 3 and the forward lens group 2 is made small, an apparatus mounting thereon the projection optical unit can be generally made compact and a preferred effect can be especially produced, in which a height below a screen can be made small.

In this manner, with a combination of a transmission type lens optical system having a free-form surface configuration and a reflecting optical system having a free-form surface configuration, it is possible, especially in case of being suited to a front projection type display system, to surely and relatively readily realize an increase in angle of view, which is strongly demanded of a front projection type, and to realize a system as a projection display system, which is compact and small as a whole. In case of being suited to a rear projection type display unit, it is possible to surely and relatively readily realize an increase in angle of view and to realize a unit as a projection display unit, which is compact and small as a whole.

Figure 12:
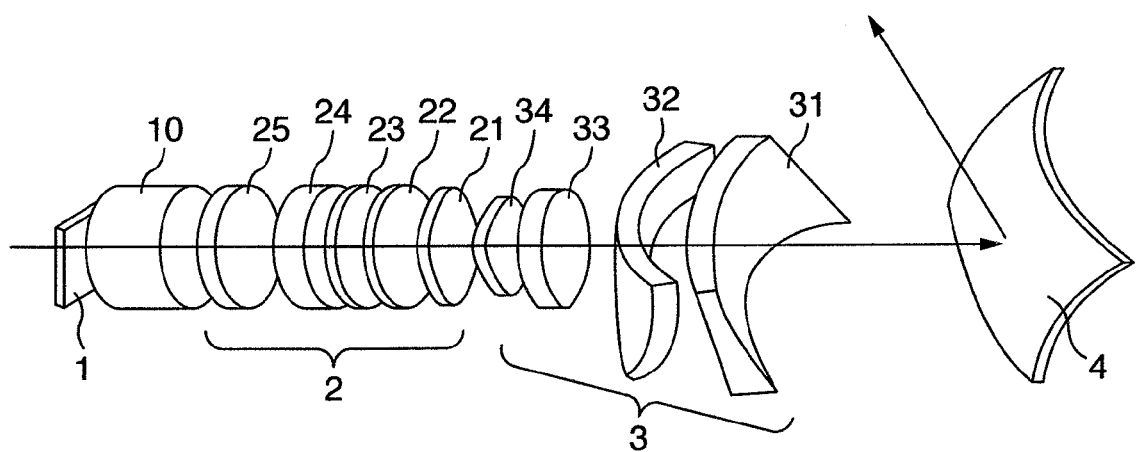
FIG. 12 is a perspective view showing an example of a lens arrangement in the optical unit of FIG. 11.

FIGS. 12, 13A and 13B show details of an optical element including a lens optical system and a reflecting optical system of a projection optical unit, which constitutes the projection display unit. FIG. 12 is a perspective view showing the projection optical unit. FIG. 13A shows a vertical cross section of the unit, and FIG. 13B shows a horizontal cross section of the unit.

Figure 14:
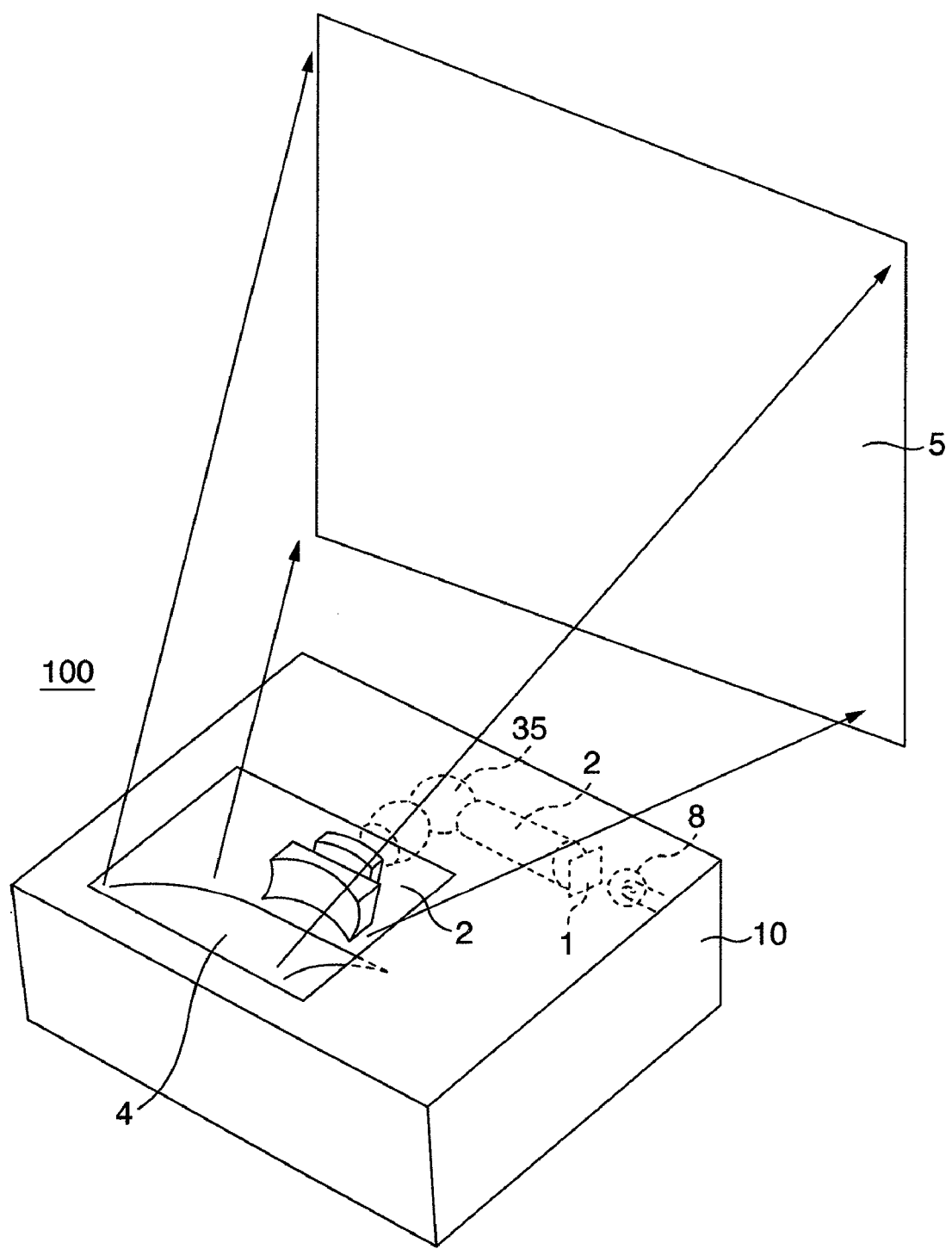
FIG. 14 is a perspective view showing a whole configuration of a projection display unit according to a further embodiment of the invention.
Figure 15:
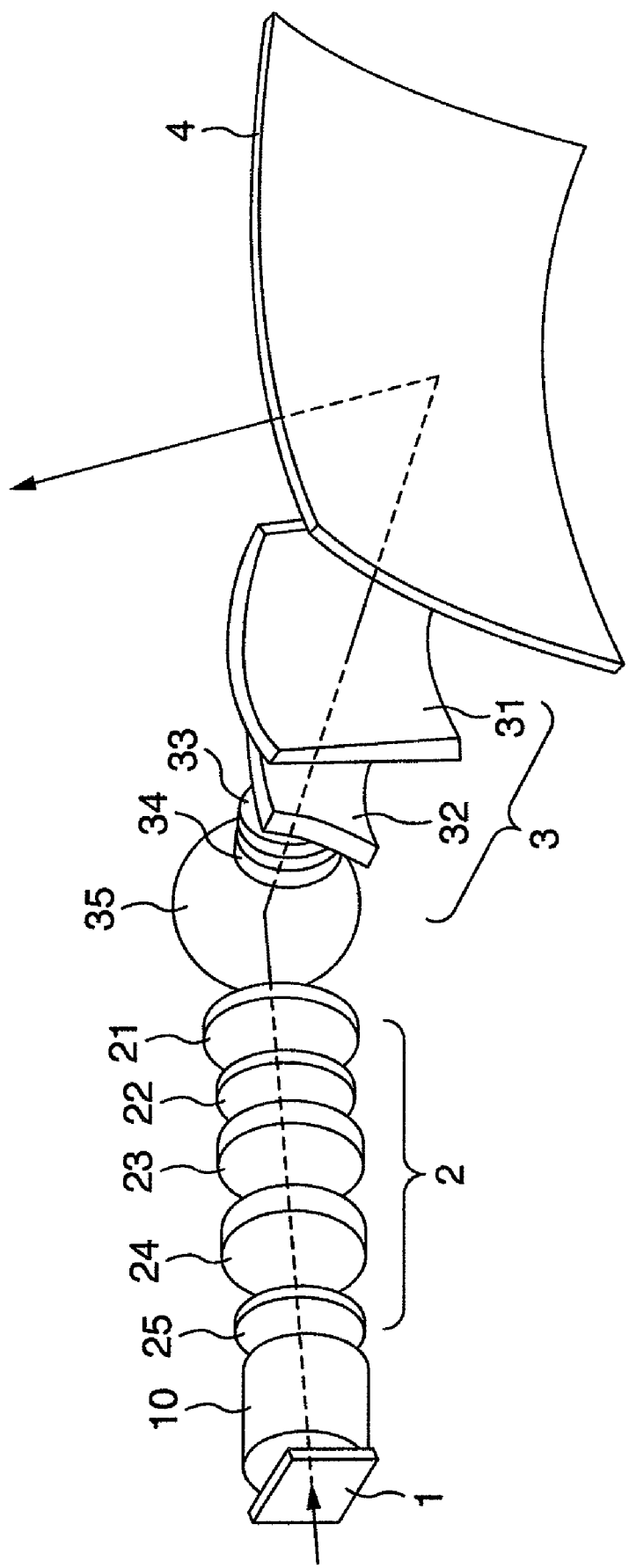
FIG. 15 is a perspective view showing an example of a lens arrangement in an optical unit in the projection display unit according to the further embodiment.

As shown in these figures, with the lens optical system, a projected image outgoing through the prism 10 from the image display element 1 is first incident on the forward lens group 2 including a plurality of lenses having a configuration of rotational symmetry. As described above, the forward lens group 2 includes spherical lenses and aspheric lenses, which are of rotational symmetry. Alternatively, a bending mirror 35 may be arranged between the forward lens group 2 and the rear lens group 3 to bend a light beam at right angle as shown in FIGS. 14 and 15.

The rear lens group 3 is composed of at least two free-form surface lenses. As shown in these figures, a free-form surface lens 31 closest to a reflecting surface "S23" of the reflecting mirror 4 is set so that its recess is oriented in a light outgoing direction and a portion thereof, through which a light beam incident on a lower end of the screen passes, is larger in curvature than a portion thereof, through which a light beam incident on an upper end of the screen passes. The free-form surface lens is curved so that its recess is oriented in a light outgoing direction and shaped so that a portion thereof, through which a light beam incident on a lower end of the screen passes, is larger in curvature than a portion thereof, through which a light beam incident on an upper end of the screen passes.

The embodiment is constructed so as to meet the following conditions. The reference numeral 12 in a cross section shown in FIG. 11 denotes a light beam outgoing from a lower end of an image plane of the image display element 1 to pass a center of an entrance pupil of the forward lens group 2 to be incident on a point P6 at an upper end of an image plane on the screen 5. "L1" indicates an optical path length to the point P6 on the screen from a point P3, at which the light beam 12 passes through the free-form surface mirror 4. The reference numeral 13 denotes a light beam outgoing from an upper end of the image plane of the image display element 1 to pass the center of the entrance pupil of the forward lens group 2 to be incident on a point P4 at a lower end of the image plane on the screen 5. "L2" indicates an optical path length to the point P4 on the screen from a point P1, at which the light beam 13 passes through the free-form surface mirror 4. The projection optical unit is constructed so that "L1" and "L2" meet the following formula.

$$|L1-L2| < 1.2 * \sin\theta_s * Dv \qquad \text{(Formula 1)}$$

Here, "Dv" indicates a size of the image plane on the screen in a cross section shown in FIG. 11, in other words, a distance to the point P4 at a lower end of the image plane from the point P6 at the upper end of the image plane on the screen. "θs" indicates the oblique incident angle.

Figure 16:
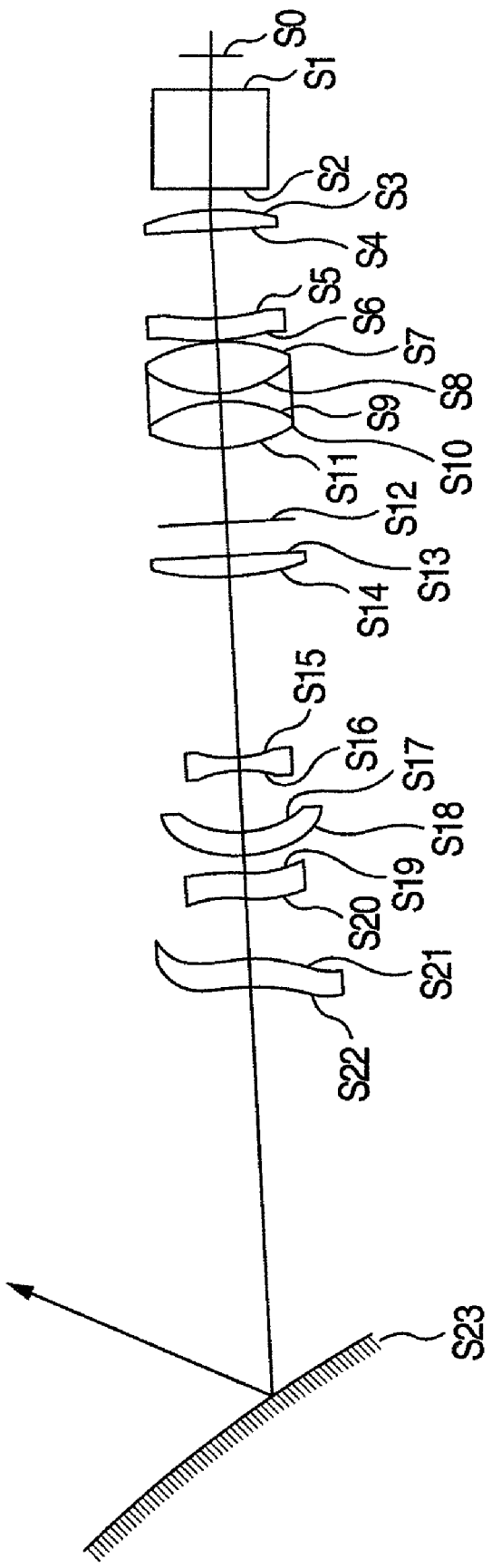
FIG. 16 is a vertical, cross sectional view illustrating lens surfaces of the optical unit.

On the other hand, the image display element 1 is arranged so that a center of its display image plane is positioned on the optical axis of the lens optical system, or it is alternatively desirably arranged so that a normal line to the display image plane is slightly inclined to the optical axis of the lens optical system as shown in FIG. 16.

Referring to FIG. 11, an optical path length to the point P6 from the point P3 is larger than that to the point P4 from the point P1. This means that the image point P6 on the screen is more distant from the lens optical system than the image point P4. Here, provided that an object point (a point on the display image plane) corresponding to the image point P6 on the screen is located close to the lens optical system and an object point corresponding to the image point P4 is located distant from the lens optical system, it is possible to correct an inclination of an image surface. In order to do so, it is preferred that a normal vector centrally of the display image plane of the image display element 1 be slightly inclined to the optical axis of the lens optical system in a plane, which includes a normal line to the screen 5 and the image-plane central light beam, as shown in FIG. 16. A direction of the inclination is preferably opposite to a direction, in which the screen 5 is positioned.

In addition, while there has been known a method of inclining an object plane in order to obtain an image plane inclined to an optical axis, an image surface obtained due to inclination of an object plane is deformed asymmetrically with respect to the optical axis with an angle of view having a practical magnitude, so that correction has been difficult with a projection lens of rotational symmetry. According to the embodiment, since the free-form surface lens 31 of rotational asymmetry and further a free-form surface lens 32 are used in the rear lens group 3, it is possible to meet an asymmetrical deformation of an image surface. Therefore, by inclining an object surface, that is, inclining a display surface of an image display element, it is possible to greatly decrease a low-order distortion of an image surface, so that the construction is effective in assisting correction of aberration caused by a free-form surface.

In an operation of the respective optical components described above, the forward lens group 2 (lenses 21 to 25) in the lens optical system forms a main lens, which projects the displayed image of the image display element 1 onto the screen 5, and corrects a fundamental aberration in an optical system of rotational symmetry. The rear lens group 3 (lenses 31 to 34) in the lens optical system is composed of lenses having a free-form surface configuration being not of rotational symmetry (rotational asymmetry). Furthermore, since the reflecting optical system 4 is composed of a reflecting surface having a free-form surface configuration being not of rotational symmetry, aberration caused by inclined incidence is mainly corrected. In this manner, the mirror 4, which constitutes the reflecting optical system, mainly corrects a trapezoidal distortion, while the rear lens group 3 of the lens optical system mainly corrects an asymmetrical distortion such as distortion of an image surface, etc.

As described above, according to the embodiment, the reflecting optical system is composed of a single reflecting surface (mirror) 4 having a free-form surface configuration being not of rotational symmetry, and the rear lens group 3 of the lens optical system is composed of two transmission lenses (lenses 31 and 32 on the side of the reflecting mirror 4), both surfaces of which have a free-form surface configuration of rotational asymmetry. In addition, the free-form surface mirror 4 is curved so that its projection is oriented in a reflecting direction. A portion of the free-form surface mirror 4, which reflects a light beam incident on a lower end of the screen, is set to be larger in curvature than a portion thereof, which reflects a light beam incident on an upper end of the screen. The portion, which reflects a light beam incident on the lower end of the screen, may be convex-shaped in the reflecting direction while the portion thereof, which reflects a light beam incident on the upper end of the screen, may be concave-shaped in the reflecting direction.

A distance between an origin of coordinates on the reflecting surface (mirror) 4 of the reflecting optical system and a lens surface of the forward lens group 2 closest to the reflecting surface (mirror) 4 in a direction along the optical axis is desirably set to be five times a focal distance of the forward lens group 2 or more. By doing this, the reflecting surface of the reflecting optical system having a free-form surface configuration enables further effectively correcting aberration caused by a trapezoidal distortion, thus enabling obtaining a favorable performance.

An explanation will be given below to examples with concrete numerical values.

EXAMPLE 1

Figure 2:
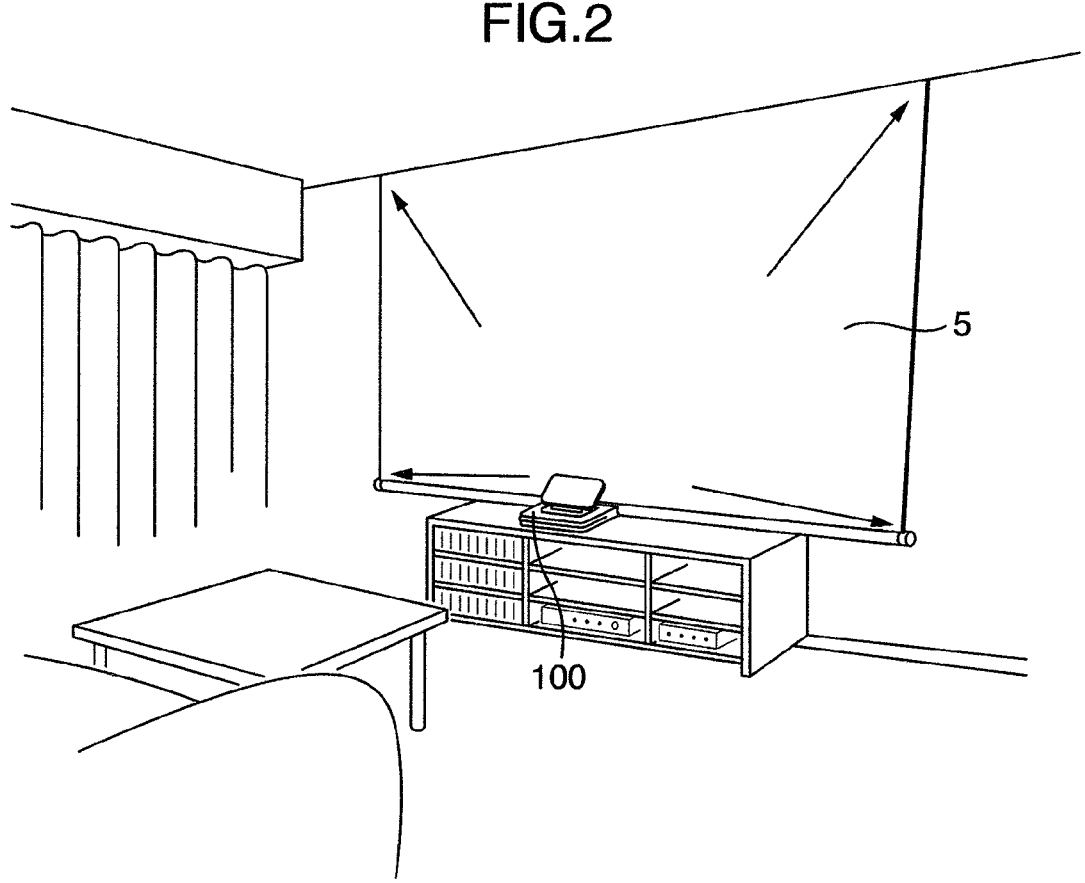
FIG. 2 is a view showing a configuration in which the projection display system according to the invention is adopted in a home theater.
Figure 17:
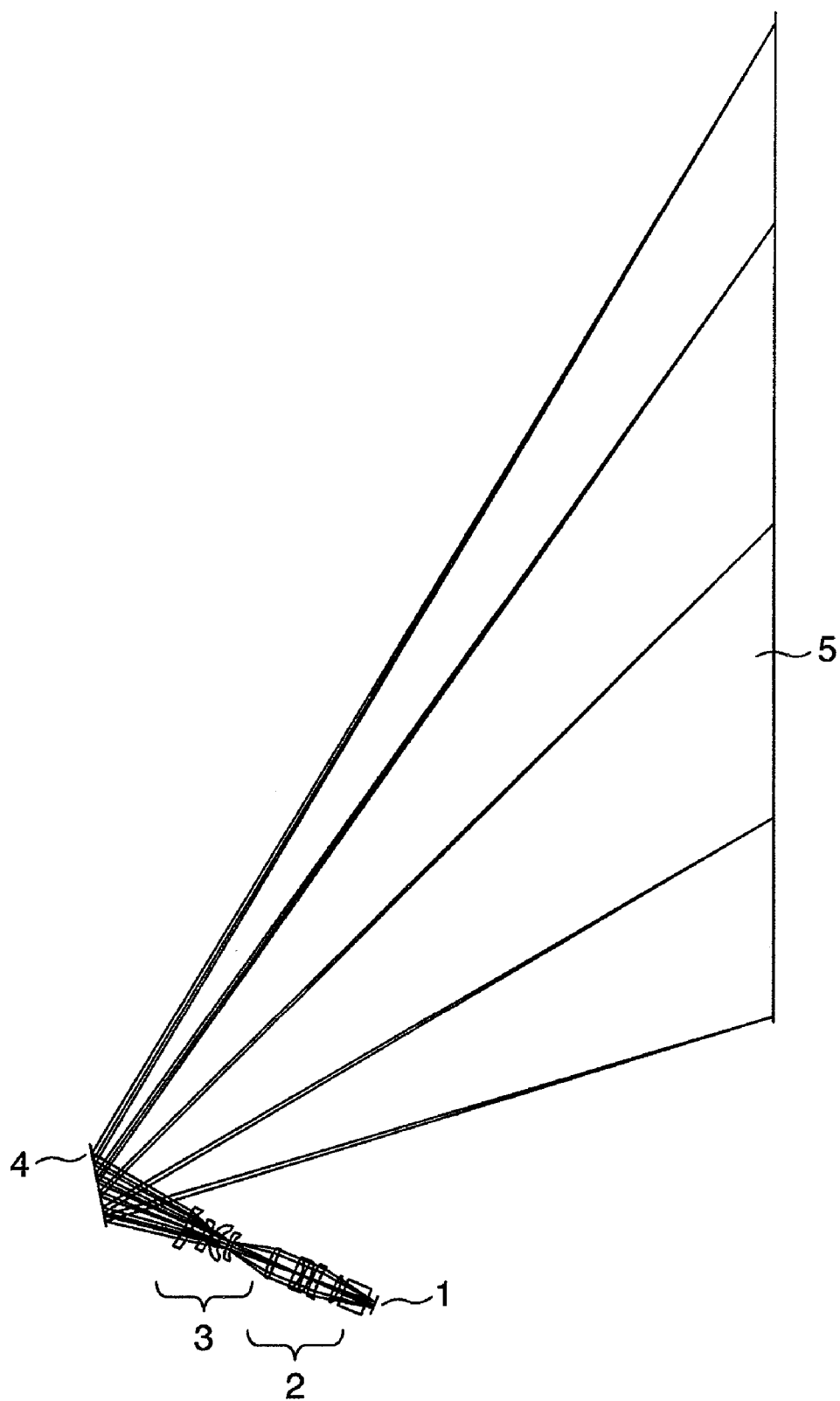
FIG. 17 is a Y-Z cross sectional view showing an optical path in the projection display unit of the invention.
Figure 18:
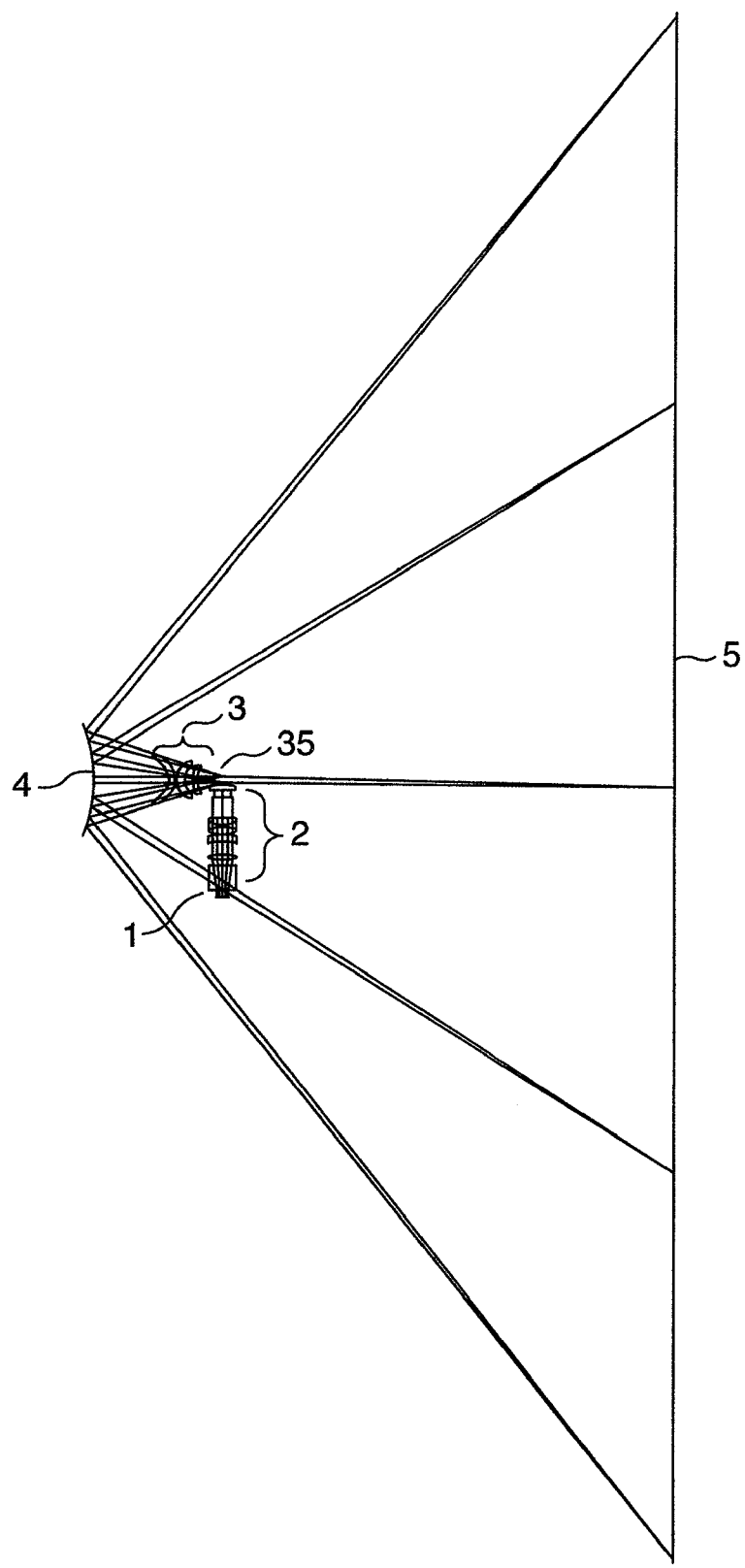
FIG. 18 is an X-Z cross sectional view showing an optical path in the projection display unit of the invention.

First, referring to FIGS. 17 and 18 and using the following TABLES 1 to 4, details of the projection optical unit, according to the embodiment, described above will be described with concrete, numerical values of a lens optical system and an optical element including the lens optical system especially illustrated. These figures show diagrams of light beams of the optical system, according to the invention, based on a first numerical example. FIG. 17 shows a Y-Z cross section in the X-Y-Z rectangular coordinate system of FIG. 2, that is, develops the optical system in a Z-axis direction. FIG. 18 shows the construction in an X-Z cross section. In addition, FIG. 18 shows an example, details of the construction of which are shown in FIGS. 14 and 15, and in which the bending mirror 35 is mounted midway between the forward lens group 2 and the rear lens group 3 of the lens optical system to once bend an optical path in an X-axis direction.

In the example, a light outgoing from the projected image display element 1 shown in a lower region of FIG. 17 passes through the forward lens group 2, which is composed only of lenses each having only a surface having a configuration of rotational symmetry, out of the lens optical system including a plurality of lenses. Then the light passes through the rear lens group 3 including free-form surface lenses of rotational asymmetry and is reflected by the reflecting surface of the free-form surface mirror 4 being a reflecting optical system. The reflected light is then incident on the screen 5.

In this embodiment, the forward lens group 2 of the lens optical system is composed of a plurality of lenses, which all have a refractive surface having a configuration of rotational symmetry, four out of the refractive surfaces of the lenses being aspheric surfaces, which are of rotational symmetry, and the remaining surfaces being spherical surfaces. In addition, the aspheric surfaces of rotational symmetry are represented by the following formula with the use of a local cylindrical coordinates system every surface.

$$Z = \frac{cr^2}{1 + \sqrt{1-(1+k)c^2r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20} \quad \text{(Formula 2)}$$

Here, "r" indicates a distance from an optical axis and "Z" indicates a quantity of sag. "c" indicates a curvature at an apex, "k" indicates a cone constant, and "A" to "J" indicate coefficients of terms of "r" power.

On the other hand, free-form surfaces, which form the rear lens group 3 of the lens optical system, are represented by the following formula, which includes a polynomial of x and y, with the use of local rectangular coordinate systems (x, y, z), origins of which are positioned on apices of respective surfaces.

$$Z = \frac{cr^2}{1 + \sqrt{1-(1+k)c^2r^2}} + \sum_m \cdot \sum_n (C(m,n) \cdot x^m \cdot y^n) \quad \text{(Formula 3)}$$

Here, "Z" indicates a quantity of sag of a free-form surface configuration in a direction perpendicular to X-axis and Z-axis, "c" indicates a curvature at an apex, "r" indicates a distance from an origin in a plane of X-axis and Y-axis, "k" indicates a cone constant, and "C(m, n)" indicates a coefficient of a polynomial.

Subsequently, the following TABLE 1 indicates numerical data of the optical system according to the example. "S0" to "S23", respectively, in TABLE 1 correspond to characters "S0" to "S23" shown in FIG. 13. The character "S0" denotes a display surface, that is, an object surface of an image display element 11 and "S23" denotes a reflecting surface of a free-form surface mirror 5. While being not shown in these figures, the character "S24" denotes a plane of incidence, that is, an image surface of the screen 5 of FIG. 11.

TABLE 1

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.06 | | |
| S3 | 246.358 | 4.65 | 1.85306 | 17.2 |
| S4 | −84.858 | 18.00 | | |
| S5 * | −83.708 | 9.00 | 1.49245 | 42.9 |
| S6 * | −75.314 | 0.10 | | |
| S7 | 41.651 | 9.32 | 1.49811 | 60.9 |
| S8 | −42.282 | 2.50 | 1.76014 | 20.0 |
| S9 | 29.550 | 0.10 | | |
| S10 | 29.476 | 9.00 | 1.49811 | 60.9 |
| S11 | −79.153 | 25.90 | | |
| S12 | Infinity | 9.10 | | |
| S13 | −265.353 | 6.00 | 1.85306 | 17.2 |
| S14 | −53.869 | 65.00 | | |
| S15 | −24.898 | 4.19 | 1.74702 | 33.2 |
| S16 | −58.225 | 9.00 | | |
| S17 * | −27.332 | 10.00 | 1.49245 | 42.9 |
| S18 * | −32.424 | 2.50 | | |
| S19 # | Infinity | 8.00 | 1.49245 | 42.9 |
| S20 # | Infinity | 20.51 | | |
| S21 # | Infinity | 8.00 | 1.49245 | 42.9 |
| S22 # | Infinity | 160.99 | | |
| S23 # | Infinity | −705.00 | REFL | |

Here, "Rd" in TABLE 1 indicates a radius of curvature of each surface, which is represented by a positive value in the case where a center of curvature is located on the left of an associated surface in FIG. 13 and by a negative value in the reverse case. "TH" in TABLE 1 is a face-to-face distance, which indicates a distance to an apex of a subsequent lens surface from an apex of an associated lens surface. A face-to-face distance is represented by a positive value when a subsequent lens surface is located relative to an associated lens surface on the left in the figure, and by a negative value when a subsequent lens surface is located on the right.

Further, "S5", "S6", "S17" and "S18" in TABLE 1 denote aspheric surfaces of rotational symmetry, which are intelligibly indicated by "*" added laterally of a surface number in TABLE 1, and coefficients of the four aspheric surfaces are indicated in the following TABLE 2.

TABLE 2

| Surface | | | Coefficient of aspheric surface | | | | | |
|---|---|---|---|---|---|---|---|---|
| S5 | K | −11.7678542 | C | −1.159E−11 | F | 2.98642E−20 | J | −1.255E−26 |
| | A | −2.7881E−06 | D | −3.2834E−14 | G | 1.05201E−21 | | |
| | B | 9.67791E−09 | E | 1.09359E−16 | H | 1.96001E−24 | | |
| S6 | K | −5.4064901 | C | 2.0324E−12 | F | 3.0211E−19 | J | −1.4982E−26 |
| | A | 6.14967E−07 | D | −2.2078E−14 | G | 4.30049E−22 | | |
| | B | 4.60362E−09 | E | −8.0538E−17 | H | 4.79618E−24 | | |
| S17 | K | 1.016429122 | C | −9.0262E−11 | F | −1.0521E−18 | J | −6.0837E−26 |
| | A | −1.1068E−05 | D | −1.3984E−13 | G | −8.1239E−23 | | |
| | B | 7.21301E−08 | E | 3.1153E−16 | H | 3.86174E−23 | | |
| S18 | K | 0.742867686 | C | −2.2719E−11 | F | 1.09398E−19 | J | 9.02232E−29 |
| | A | 1.51788E−07 | D | −4.6853E−14 | G | 1.62146E−22 | | |
| | B | 2.10472E−08 | E | 2.9666E−17 | H | −3.0801E−25 | | |

"S19" to "S22" in TABLE 1 denote refractive surfaces having a free-form surface configuration and constituting a rear lens group of the lens optical system and "S23" denotes a reflecting surface of a free-form surface "S23" of the reflecting optical system, which is indicated by "#" added laterally of a surface number. The following TABLE 3 indicates values of coefficients representative of the five free-form surface configurations.

TABLE 3

| Surface | | | coefficient of freE-form surface | | | | | |
|---|---|---|---|---|---|---|---|---|
| S19 | | | C17 | 5.38933E−07 | C34 | −1.2381E−09 | C51 | −7.4126E−14 |
| | K | 0 | C19 | 8.33432E−07 | C36 | 1.13944E−09 | C53 | 2.05074E−12 |
| | C4 | 0.013500584 | C21 | −4.6367E−08 | C37 | 3.87771E−12 | C55 | −9.2166E−13 |
| | C6 | 0.003493312 | C22 | −6.2643E−09 | C39 | 1.04779E−11 | C56 | −2.5867E−15 |
| | C8 | −0.00083921 | C24 | −2.2449E−08 | C41 | 1.80038E−11 | C58 | −8.7122E−15 |
| | C10 | −0.00032098 | C26 | −5.6706E−08 | C43 | 5.23019E−11 | C60 | 2.85321E−14 |
| | C11 | 8.59459E−06 | C28 | 9.69952E−10 | C45 | 1.69253E−11 | C62 | −8.5084E−14 |
| | C13 | 2.14814E−06 | C30 | −1.1968E−10 | C47 | −2.7E−14 | C64 | 1.25198E−13 |
| | C15 | 7.54355E−06 | C32 | −1.3638E−09 | C49 | 7.30978E−13 | C66 | −5.6277E−14 |
| S20 | | | C17 | 7.49262E−07 | C34 | −5.7462E−10 | C51 | −3.6141E−13 |
| | K | 0 | C19 | 1.19039E−06 | C36 | 1.27396E−09 | C53 | 8.54188E−14 |
| | C4 | 0.015488689 | C21 | −1.2953E−07 | C37 | −4.7746E−12 | C55 | −5.3469E−13 |
| | C6 | 0.006553414 | C22 | 5.115E−10 | C39 | 7.32855E−12 | C56 | 8.92545E−17 |
| | C8 | −0.00116756 | C24 | −2.1936E−08 | C41 | 5.30157E−11 | C58 | −5.3434E−15 |
| | C10 | −0.00033579 | C26 | −5.9543E−08 | C43 | 5.05014E−11 | C60 | 1.96533E−14 |
| | C11 | 7.5015E−06 | C28 | 2.03972E−08 | C45 | −2.1894E−11 | C62 | −1.3923E−13 |
| | C13 | −2.5728E−06 | C30 | 1.16701E−11 | C47 | −1.2515E−13 | C64 | 1.06322E−13 |
| | C15 | −1.3543E−06 | C32 | −1.6198E−09 | C49 | 7.64489E−13 | C66 | −4.6602E−15 |
| S21 | | | C17 | −1.0379E−07 | C34 | 2.81743E−10 | C51 | −8.1775E−15 |
| | K | 0 | C19 | 3.0082E−08 | C36 | 6.05663E−10 | C53 | 3.06022E−14 |
| | C4 | 0.015096874 | C21 | 7.95521E−08 | C37 | 8.39381E−13 | C55 | −9.1775E−13 |
| | C6 | 0.009982808 | C22 | −1.3911E−09 | C39 | 4.98531E−12 | C56 | −7.8543E−17 |
| | C8 | 0.000358347 | C24 | 9.33292E−10 | C41 | 1.37477E−11 | C58 | −8.9588E−16 |
| | C10 | 0.000209267 | C26 | 3.54468E−09 | C43 | −1.0671E−11 | C60 | −6.0768E−15 |
| | C11 | −3.8593E−07 | C28 | 4.1615E−09 | C45 | 9.04109E−12 | C62 | −1.9528E−14 |
| | C13 | −6.8336E−06 | C30 | −1.2331E−11 | C47 | 2.48401E−14 | C64 | 2.6781E−14 |
| | C15 | −2.2455E−05 | C32 | −2.3367E−10 | C49 | 6.92603E−14 | C66 | −1.4324E−14 |
| S22 | | | C17 | −3.6973E−07 | C34 | 4.8045E−10 | C51 | −2.9795E−13 |
| | K | 0 | C19 | −3.0682E−07 | C36 | 1.43328E−10 | C53 | −2.5306E−14 |
| | C4 | 0.022813527 | C21 | 4.12093E−08 | C37 | −2.0707E−12 | C55 | −3.9401E−13 |
| | C6 | 0.012060543 | C22 | 4.07969E−09 | C39 | −4.9221E−12 | C56 | 6.88651E−16 |
| | C8 | 0.000638931 | C24 | 8.5986E−09 | C41 | −2.3681E−12 | C58 | 1.55006E−15 |
| | C10 | 0.000196027 | C26 | 2.1713E−08 | C43 | −2.1567E−11 | C60 | −1.4674E−15 |
| | C11 | −7.1204E−06 | C28 | 1.63499E−08 | C45 | −2.3679E−12 | C62 | −9.9822E−15 |
| | C13 | −1.269E−05 | C30 | 1.38704E−10 | C47 | −5.7167E−15 | C64 | 2.72925E−14 |
| | C15 | −2.5184E−05 | C32 | 2.02372E−10 | C49 | −9.0337E−14 | C66 | −1.1966E−14 |

TABLE 3-continued

| Surface | | | coefficient of freE-form surface | | | | | |
|---|---|---|---|---|---|---|---|---|
| S23 | | C17 | −1.1083E−09 | C34 | −4.9118E−14 | C51 | −5.4918E−19 |
| | K | 0 | | C19 | −5.7768E−10 | C36 | 8.12546E−14 | C53 | −2.2569E−18 |
| | C4 | 0.001597194 | C21 | 1.60076E−10 | C37 | −7.486E−17 | C55 | −3.5657E−18 |
| | C6 | 0.001324181 | C22 | 1.91534E−12 | C39 | 6.80626E−16 | C56 | 1.09883E−21 |
| | C8 | 1.37885E−05 | C24 | −1.0665E−11 | C41 | −5.1295E−17 | C58 | −2.1535E−20 |
| | C10 | 1.34349E−05 | C26 | −8.6063E−12 | C43 | −3.6526E−16 | C60 | 2.01763E−20 |
| | C11 | −4.8064E−08 | C28 | −1.1125E−12 | C45 | 1.46399E−15 | C62 | −1.2016E−20 |
| | C13 | 5.24071E−08 | C30 | 6.24714E−14 | C47 | −2.1563E−18 | C64 | 3.21408E−21 |
| | C15 | 9.53861E−08 | C32 | −3.4381E−14 | C49 | 2.86073E−18 | C66 | −1.4922E−19 |

According to the invention, an object surface being a display plane of the image display element 1 is inclined −1.163 degrees to the optical axis of the lens optical system as shown in FIG. 16. For a direction of inclination, a positive value represents a direction in which a normal line to the object surface in a cross section shown in FIG. 16 turns clockwise. Accordingly, according to the Example, the object surface is inclined 1.163 degrees counterclockwise from a position perpendicular to the optical axis of the lens optical system in the cross section shown in FIG. 16.

A free-form surface mirror 4 denoted by the character "S23" shown in FIG. 13 or 16 is arranged so that an origin of its local coordinates is located on the optical axis of the lens optical system and a normal line, that is Z-axis at the origin of the local coordinates, is inclined about +29 degrees from a position in parallel to the optical axis of the lens optical system. For a direction of the inclination, a direction in which the free-form surface mirror turns clockwise in a cross section shown in FIG. 13 or 16, is made positive. That is, the free-form surface mirror is inclined counterclockwise. Thereby, an image-plane central light beam outgoing from a center of an image plane of the image display element 1 and advancing substantially along the optical axis of the lens optical system is reflected by the surface "S23" and then advances in a direction inclined 58 degrees being twice the angle of inclination to the optical axis of the lens optical system (see an arrow in the figure).

Furthermore, the following TABLE 4 indicates inclinations and eccentricities in local coordinate systems of respective surfaces in the Example. In TABLE 4, values of angle of inclination and of eccentricity are indicated on the right of a surface number. "ADE" indicates a magnitude of inclination in a plane in parallel to the cross section shown in FIG. 13, and the rule of indication is described above. "YDE" indicates a magnitude of eccentricity, the eccentricity being set in a direction perpendicular to the optical axis and in a plane in parallel to the cross section shown in FIG. 13, and eccentricity directed downward in the cross section shown in FIG. 13 being made positive. In Examples described later, inclination and eccentricity of an optical element are set in a direction in a cross section in parallel to a displayed cross section.

TABLE 4

| Surface | ADE (°) | YDE (mm) |
|---|---|---|
| S0 | −1.163 | 0.0 |
| S23 | 29.000 | 0.0 |

It is found from TABLES 1 and 3 that a curvature "c" and a conic coefficient "k" in the Example are zero (0). That is, a trapezoidal distortion caused by inclined incidence is generated extremely intensely in a direction of inclined incidence and a magnitude of distortion in a direction perpendicular thereto is small. Accordingly, there is a need for considerably different functions in the direction of inclined incidence and in a direction perpendicular thereto, and asymmetric aberration can be favorably corrected by making no use of the curvature "c" and the conic coefficient "k", which are of rotational symmetry and function omnidirectionally.

"ADE" of the surface "S23" in TABLE 4 is the same as "θm" shown in FIG. 11, and "ADE" on the surface of the screen 5 is "θs" as shown in FIG. 11. Values of the both meet the above condition, so that a height below the screen is made small so as to realize a compact optical system.

A value of a difference |L1−L2| between optical path lengths shown in the formula 1 is 0.42 times a height of the image plane of the screen and "θs" is 30 degrees, so that the condition of Formula 1 is met. Numerical values in TABLES 1 to 4 present an example in the case where a projected image in a range (12.16×6.84 mm) on an object surface (for example, a liquid crystal panel having a ratio of 16:9) is magnified and projected onto an image surface (60"+overscan: 1452.8×817.2 mm). That is, it is found that even with a relatively small distance (Lp), an object surface can be magnified and projected onto a sufficiently large image plane. That is, an excellent magnifying power of projection is resulted.

EXAMPLE 2

Example 2 will be described with reference to TABLES 5 to 8. A forward lens group 2 of a lens optical system is composed of refractive surfaces, all of which have a configuration of rotational symmetry, four out of the refractive surfaces of lenses being aspheric surfaces of rotational symmetry, and the remaining surfaces being spherical surfaces. Aspheric surfaces of axial symmetry used herein are represented by Formula 2 described above with the use of a local cylindrical coordinates system every surface. Free-form surfaces of lenses, which constitute a rear lens group 3 of the lens optical system, are represented by Formula 3 described above, which includes a polynomial of x and y, with the use of local, rectangular coordinate systems (x, y, z), origins of which are positioned on apices of respective surfaces.

The following TABLE 5 indicates lens data of the Example based on numerical values and surface numbers include "S0" for an object surface and "S1" to "S23" in this order. In TABLE 5, "Rd" indicates a radius of curvature of each surface and "TH" is a face-to-face distance, which indicates a distance to an apex of a subsequent lens surface from an apex of an associated lens surface.

TABLE 5

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.65 | | |
| S3 | 210.000 | 4.65 | 1.85306 | 17.2 |
| S4 | −92.276 | 18.00 | | |
| S5 * | −119.154 | 9.00 | 1.49245 | 42.9 |
| S6 * | −99.255 | 0.10 | | |

TABLE 5-continued

| Surface | Rd | TH | nd | vd |
|---|---|---|---|---|
| S7 | 41.165 | 9.32 | 1.49811 | 60.9 |
| S8 | −43.298 | 2.50 | 1.76014 | 20.0 |
| S9 | 29.535 | 0.10 | | |
| S10 | 29.472 | 9.00 | 1.49811 | 60.9 |
| S11 | −81.846 | 25.90 | | |
| S12 | Infinity | 9.10 | | |
| S13 | −259.960 | 6.00 | 1.85306 | 17.2 |
| S14 | −54.061 | 65.00 | | |
| S15 | −24.878 | 4.19 | 1.74702 | 33.2 |
| S16 | −64.884 | 9.00 | | |
| S17 * | −29.009 | 10.00 | 1.49245 | 42.9 |
| S18 * | −28.892 | 2.50 | | |

TABLE 5-continued

| Surface | Rd | TH | nd | vd |
|---|---|---|---|---|
| S19 # | Infinity | 8.00 | 1.49245 | 42.9 |
| S20 # | Infinity | 20.51 | | |
| S21 # | Infinity | 8.00 | 1.49245 | 42.9 |
| S22 # | Infinity | 159.95 | | |
| S23 # | Infinity | −852.00 | REFL | |

In TABLE 5, surfaces "S5", "S6", "S17", and "S18" denote aspheric surfaces of rotational symmetry, which are intelligibly indicated by "*" added laterally of a surface number in TABLE 1, and coefficients of the four aspheric surfaces are indicated in the following TABLE 6.

TABLE 6

| Surface | | | Coefficient of aspheric surface | | | | | |
|---|---|---|---|---|---|---|---|---|
| S5 | K | −23.3033479 | C | −9.6351E−12 | F | 6.40059E−20 | J | 5.14145E−27 |
| | A | −2.4809E−06 | D | −3.1244E−14 | G | −2.06E−22 | | |
| | B | 6.68597E−09 | E | 1.70809E−16 | H | −1.9587E−24 | | |
| S6 | K | −7.95321673 | C | −2.8461E−12 | F | 1.68916E−19 | J | −4.2604E−27 |
| | A | 8.81129E−07 | D | −4.2436E−16 | G | −4.7764E−22 | | |
| | B | 3.27597E−09 | E | −2.4174E−17 | H | 3.1265E−24 | | |
| S17 | K | 1.294916014 | C | −8.1246E−11 | F | −8.1666E−19 | J | −9.4083E−26 |
| | A | −1.7719E−05 | D | −1.8651E−13 | G | 7.81036E−22 | | |
| | B | 5.73314E−08 | E | 2.9427E−16 | H | 3.77766E−23 | | |
| S18 | K | 0.463935076 | C | −1.1724E−11 | F | 1.23091E−19 | J | −2.0819E−28 |
| | A | −3.417E−06 | D | −5.4303E−14 | G | 1.99428E−22 | | |
| | B | 1.57331E−08 | E | 1.37371E−17 | H | −3.4914E−25 | | |

"S19" to "S22" in TABLE 5 denote refractive surfaces having a free-form surface configuration and constituting a rear group of the lens optical system and "S23" denotes a reflecting surface of the reflecting optical system, which has a free-form surface configuration and is indicated by "#" added laterally of a surface number. The following TABLE 7 indicates values of coefficients representative of the five free-form surface configurations.

TABLE 7

| Surface | | | coefficient of free-form surface | | | | | |
|---|---|---|---|---|---|---|---|---|
| S19 | | | C17 | 5.06259E−07 | C34 | −1.4837E−09 | C51 | −1.0027E−12 |
| | K | 0 | C19 | 4.85077E−07 | C36 | 1.31263E−09 | C53 | 6.99745E−13 |
| | C4 | 0.017559144 | C21 | −1.5853E−07 | C37 | 1.83299E−12 | C55 | −1.6619E−12 |
| | C6 | 0.001733207 | C22 | −5.42E−09 | C39 | −4.3583E−13 | C56 | −1.9766E−15 |
| | C8 | −0.00066382 | C24 | −1.5702E−08 | C41 | 2.72981E−11 | C58 | 1.40369E−15 |
| | C10 | −0.00013226 | C26 | −5.9063E−08 | C43 | 3.0878E−11 | C60 | 1.05828E−14 |
| | C11 | 8.28618E−06 | C28 | −7.7982E−09 | C45 | 2.26152E−11 | C62 | −8.9296E−14 |
| | C13 | 1.03545E−06 | C30 | −1.0233E−10 | C47 | 2.99348E−14 | C64 | 7.84407E−14 |
| | C15 | 8.99822E−06 | C32 | −8.8036E−10 | C49 | 4.57827E−13 | C66 | −9.1078E−14 |
| S20 | | | C17 | 7.92636E−07 | C34 | −1.6758E−09 | C51 | −3.5813E−13 |
| | K | 0 | C19 | 8.89146E−07 | C36 | 1.45469E−09 | C53 | 6.84539E−13 |
| | C4 | 0.021458089 | C21 | −1.4324E−07 | C37 | −7.7649E−12 | C55 | −1.511E−12 |
| | C6 | 0.004154169 | C22 | −1.0382E−09 | C39 | −2.0012E−12 | C56 | 1.77674E−15 |
| | C8 | −0.00099953 | C24 | −1.3146E−08 | C41 | 5.28532E−11 | C58 | 5.96659E−15 |
| | C10 | −0.00011911 | C26 | −5.677E−08 | C43 | 2.30872E−11 | C60 | −2.0891E−15 |
| | C11 | 8.42605E−06 | C28 | 6.05026E−09 | C45 | 1.03045E−11 | C62 | −9.4541E−14 |
| | C13 | −6.6069E−06 | C30 | 2.65443E−11 | C47 | −1.2622E−13 | C64 | 1.01913E−13 |
| | C15 | −3.2455E−07 | C32 | −1.5185E−09 | C49 | 7.4513E−13 | C66 | −8.0588E−14 |
| S21 | | | C17 | −1.0996E−07 | C34 | 6.726E−11 | C51 | −1.0707E−13 |
| | K | 0 | C19 | 1.27907E−07 | C36 | 7.7809E−10 | C53 | −6.8789E−14 |
| | C4 | 0.016481821 | C21 | 1.59073E−07 | C37 | 1.78369E−12 | C55 | −1.3595E−12 |
| | C6 | 0.009814027 | C22 | −2.3156E−09 | C39 | 5.1641E−12 | C56 | −4.5963E−16 |
| | C8 | 0.000360473 | C24 | −1.533E−10 | C41 | 1.45879E−11 | C58 | −1.5431E−15 |
| | C10 | 0.000256882 | C26 | 6.12508E−09 | C43 | 4.21499E−12 | C60 | −9.4112E−15 |
| | C11 | −1.2641E−06 | C28 | 4.69033E−09 | C45 | 2.24112E−11 | C62 | −1.7181E−14 |
| | C13 | −7.1071E−06 | C30 | −3.0818E−11 | C47 | 5.4765E−14 | C64 | 1.14179E−14 |
| | C15 | −2.6709E−05 | C32 | −3.7474E−10 | C49 | 3.77477E−14 | C66 | −1.4481E−14 |

TABLE 7-continued

| Surface | | | coefficient of free-form surface | | | | |
|---|---|---|---|---|---|---|---|
| S22 | | C17 | −4.2509E−07 | C34 | 6.03428E−10 | C51 | −4.5666E−13 |
| | K | 0 | | C19 | −2.8996E−07 | C36 | 2.79273E−10 | C53 | −1.1058E−13 |
| | C4 | 0.024865431 | C21 | 1.2041E−08 | C37 | −1.9296E−12 | C55 | −5.1945E−13 |
| | C6 | 0.013574823 | C22 | 4.59025E−09 | C39 | −4.3532E−12 | C56 | 5.15206E−16 |
| | C8 | 0.000656946 | C24 | 9.31761E−09 | C41 | −1.0393E−11 | C58 | 1.80646E−15 |
| | C10 | 0.00023588 | C26 | 3.01345E−08 | C43 | −1.737E−11 | C60 | −1.4435E−16 |
| | C11 | −9.5439E−06 | C28 | 2.56904E−08 | C45 | −6.9004E−13 | C62 | −1.1182E−14 |
| | C13 | −1.3485E−05 | C30 | 1.87694E−10 | C47 | −2.2366E−16 | C64 | 1.55635E−14 |
| | C15 | −3.0664E−05 | C32 | 1.26944E−10 | C49 | −1.2748E−13 | C66 | −1.4201E−14 |
| S23 | | C17 | −9.3593E−10 | C34 | −4.9686E−14 | C51 | 1.8026E−18 |
| | K | 0 | C19 | −6.409E−10 | C36 | −5.1319E−14 | C53 | −8.6197E−18 |
| | C4 | 0.001494744 | C21 | 3.91751E−10 | C37 | −8.103E−17 | C55 | 1.1354E−17 |
| | C6 | 0.001287983 | C22 | 1.80884E−12 | C39 | 5.19251E−16 | C56 | 1.89778E−21 |
| | C8 | 1.19776E−05 | C24 | −8.191E−12 | C41 | 1.38639E−16 | C58 | −1.6083E−20 |
| | C10 | 1.18228E−05 | C26 | −7.7154E−12 | C43 | −8.0016E−16 | C60 | 9.98054E−21 |
| | C11 | −4.3922E−08 | C28 | 9.92084E−14 | C45 | 2.67935E−16 | C62 | 4.42337E−21 |
| | C13 | 3.28597E−08 | C30 | 4.90899E−14 | C47 | −1.5465E−18 | C64 | −1.4286E−20 |
| | C15 | 8.20779E−08 | C32 | −1.3332E−14 | C49 | 1.58291E−18 | C66 | 6.04404E−21 |

Further, the following TABLE 8 shows an inclination of and a magnitude of eccentricity of each surface in Example 2. A rule for representation of values of "ADE" and "YDE" in TABLE 8 is described above. Inclinations of respective surfaces in the Example are substantially the same in magnitude as those in Embodiment 1.

TABLE 8

| Surface | ADE (°) | YDE (mm) |
|---|---|---|
| S0 | −1.289 | 0.0 |
| S15 | 0.0 | −0.193 |
| S17 | 0.0 | 0.193 |
| S23 | 28.814 | 0.0 |

ADE (=θm) of "S23" and ADE (=θs) of the screen surface 5 in TABLE 8 meet the condition to realize a compact optical system in which a height below a screen is small.

It is found that a value of a difference |L1−L2| of optical path lengths shown in Formula 1 is 0.43 times a height of the image plane of the screen and "θs" is 30 degrees, so that the condition of Formula 1 is met.

On the other hand, according to Example 2, the surface "S15" is made eccentric by −0.193 mm, and the surface "S17" is made reversely eccentric by 0.193 mm as illustrated in TABLE 8. In the case where a certain surface is made eccentric, optical axes of succeeding surfaces are shifted a magnitude of eccentricity. Accordingly, "S15" and "S17" being made eccentric thus means that a single lens composed of "S15" and "S16" is made eccentric by −0.193 mm relative to an optical axis. A magnitude of the eccentricity is minute and does not have a bad influence which makes the lens large in size, but the eccentricity realizes fine regulation of asymmetric chromatic aberration.

It is found from TABLES 5 and 7 that a curvature "c" and a conic coefficient "k" in the Embodiment are zero (0). A trapezoidal distortion caused by inclined incidence is generated extremely intensely in a direction of inclined incidence and a magnitude of distortion in a direction perpendicular thereto is small. Accordingly, there is a need for considerably different functions in the direction of inclined incidence and in a direction perpendicular thereto, and graphic distortion can be favorably corrected by making no use of the curvature "c" and the conic coefficient "k", which are of rotational symmetry and function omnidirectionally.

An effective range, according to Example 2, based on the numerical values described above magnifies and projects a range on an object surface (a ratio of 16:9) onto an image surface (70"+over-scan: 1694.9×953.4 mm). That is, it is found that even with a relatively small distance (Lp), an object surface can be magnified and projected onto a sufficiently large image plane. Thus, an excellent magnifying power of projection is resulted.

EXAMPLE 3

Example 3 according to the invention will be described. A forward lens group 2 of a lens optical system is composed of refractive surfaces, all of which have a configuration of rotational symmetry, four out of the refractive surfaces being aspheric surfaces of rotational symmetry, and the remaining surfaces being spherical surfaces. Aspheric surfaces of axial symmetry used herein are represented by Formula 2 described above with the use of a local cylindrical coordinates system every surface. Free-form surfaces, which constitute a rear lens group 3 of the lens optical system, are represented by Formula 3 described above, which includes a polynomial of x and y, with the use of local rectangular coordinate systems (x, y, z), origins of which are positioned on apices of respective surfaces.

The following TABLE 9 indicates lens data in Example 3 and surface numbers include "S0" for an object surface and "S1" to "S23" in this order. In TABLE 9, "Rd" indicates a radius of curvature of each surface and "TH" indicates a face-to-face distance which corresponds to a distance to an apex of a subsequent lens surface from an apex of an associated lens surface.

TABLE 9

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 5.00 | | |
| S3 | 69.501 | 4.65 | 1.85306 | 17.2 |
| S4 | −477.064 | 18.00 | | |
| S5 * | −54.329 | 9.00 | 1.49245 | 42.9 |
| S6 * | −53.208 | 0.10 | | |
| S7 | 48.857 | 9.32 | 1.49811 | 60.9 |
| S8 | −29.376 | 2.50 | 1.76014 | 20.0 |
| S9 | 40.402 | 0.10 | | |
| S10 | 40.607 | 9.00 | 1.49811 | 60.9 |

TABLE 9-continued

| Surface | Rd | TH | nd | vd |
|---|---|---|---|---|
| S11 | −54.359 | 25.90 | | |
| S12 | Infinity | 9.10 | | |
| S13 | 2090.112 | 6.00 | 1.85306 | 17.2 |
| S14 | −66.019 | 65.00 | | |
| S15 | −45.540 | 4.19 | 1.74702 | 33.2 |
| S16 | 108.965 | 9.00 | | |
| S17 * | −37.449 | 10.00 | 1.49245 | 42.9 |
| S18 * | −75.474 | 2.50 | | |
| S19 # | Infinity | 8.00 | 1.49245 | 42.9 |
| S20 # | Infinity | 19.35 | | |

TABLE 9-continued

| Surface | Rd | TH | nd | vd |
|---|---|---|---|---|
| S21 # | Infinity | 8.00 | 1.49245 | 42.9 |
| S22 # | Infinity | 122.15 | | |
| S23 # | Infinity | −605.00 | REFL | |

In TABLE 9, surfaces "S5", "S6", "S17", and "S18" are aspheric surfaces of rotational symmetry, which are intelligibly indicated by "*" added laterally of a surface number, and coefficients of the four aspheric surfaces are indicated in the following TABLE 10.

TABLE 10

| Surface | | | Coefficient of aspheric surface | | | | | |
|---|---|---|---|---|---|---|---|---|
| S5 | K | −13.108806 | C | 1.46508E−11 | F | −2.0555E−19 | J | 8.25281E−27 |
| | A | −2.6018E−06 | D | −4.7767E−14 | G | 1.12416E−21 | | |
| | B | 1.95435E−08 | E | −1.5302E−16 | H | −7.5179E−25 | | |
| S6 | K | −8.59084843 | C | 1.51155E−11 | F | −1.6279E−19 | J | 1.22719E−26 |
| | A | 7.67114E−07 | D | −4.743E−15 | G | −1.8394E−21 | | |
| | B | 9.20816E−09 | E | −9.3745E−17 | H | 3.4992E−24 | | |
| S17 | K | 3.170476396 | C | −4.2843E−12 | F | 1.18119E−18 | J | 2.06192E−26 |
| | A | −8.7308E−06 | D | 1.96465E−13 | G | −4.5716E−21 | | |
| | B | −3.8136E−08 | E | 7.89179E−16 | H | −1.5681E−23 | | |
| S18 | K | 9.315246698 | C | 2.51005E−11 | F | −5.9791E−20 | J | 3.13406E−28 |
| | A | −4.2604E−06 | D | 3.09426E−14 | G | −6.6563E−23 | | |
| | B | −1.5518E−08 | E | −8.892E−18 | H | 7.14735E−26 | | |

"S19" to "S22" in TABLE 9 denote refractive surfaces having a free-form surface configuration and constituting a rear lens group of the lens optical system and "S23" denotes a reflecting surface of the reflecting optical system, which has a free-form surface configuration, and is indicated by "#" added laterally of a surface number. The following TABLE 11 indicates values of coefficients representative of the five free-form surface configurations.

TABLE 11

| Surface | | | Coefficient of free-form surface | | | | | |
|---|---|---|---|---|---|---|---|---|
| S19 | | | C17 | 3.43096E−07 | C34 | −2.7065E−10 | C51 | 1.99077E−13 |
| | K | 0 | C19 | 2.13857E−06 | C36 | 1.31926E−09 | C53 | −5.2135E−12 |
| | C4 | −0.00503963 | C21 | 9.15856E−08 | C37 | 2.1077E−12 | C55 | −2.1831E−12 |
| | C6 | 0.020700865 | C22 | −1.9441E−09 | C39 | −6.1349E−11 | C56 | −3.3204E−15 |
| | C8 | −0.0007276 | C24 | −9.6181E−09 | C41 | −6.9182E−11 | C58 | 1.52276E−14 |
| | C10 | −0.00062901 | C26 | 2.71279E−09 | C43 | −1.1634E−10 | C60 | 4.722E−14 |
| | C11 | 4.83792E−06 | C28 | 1.5813E−08 | C45 | 1.55247E−11 | C62 | 3.79581E−14 |
| | C13 | 1.58097E−05 | C30 | −4.1204E−10 | C47 | 1.79452E−14 | C64 | 3.11821E−14 |
| | C15 | −1.9636E−05 | C32 | −2.3107E−09 | C49 | −6.0452E−13 | C66 | −1.876E−13 |
| S20 | | | C17 | 6.40078E−08 | C34 | −1.0668E−09 | C51 | −4.5767E−13 |
| | K | 0 | C19 | 2.35312E−06 | C36 | −3.2106E−10 | C53 | −3.1387E−12 |
| | C4 | −0.00417899 | C21 | 9.31605E−07 | C37 | 1.82824E−12 | C55 | 1.09346E−12 |
| | C6 | 0.031326266 | C22 | −5.0811E−10 | C39 | −2.9101E−11 | C56 | −1.6513E−15 |
| | C8 | −0.00077771 | C24 | −3.1548E−08 | C41 | 1.04208E−10 | C58 | 8.47256E−15 |
| | C10 | −0.00097819 | C26 | −8.825E−08 | C43 | 7.01421E−11 | C60 | −1.694E−15 |
| | C11 | 2.05947E−06 | C28 | 3.84368E−08 | C45 | −1.0493E−10 | C62 | −1.7011E−13 |
| | C13 | 2.31241E−05 | C30 | −9.4717E−11 | C47 | 2.95795E−14 | C64 | 6.71828E−14 |
| | C15 | −3.0456E−05 | C32 | −8.4146E−10 | C49 | −7.9902E−13 | C66 | 1.92712E−14 |
| S21 | | | C17 | −1.4263E−07 | C34 | −1.7091E−10 | C51 | −4.2269E−14 |
| | K | 0 | C19 | −3.1384E−08 | C36 | −2.9029E−10 | C53 | 2.21959E−14 |
| | C4 | 0.016712489 | C21 | 3.78605E−07 | C37 | 2.14998E−13 | C55 | −9.5144E−15 |
| | C6 | 0.024854646 | C22 | 7.83561E−10 | C39 | 1.12281E−12 | C56 | −1.3876E−16 |
| | C8 | 0.000280556 | C24 | −1.1076E−09 | C41 | 3.49849E−12 | C58 | −2.0224E−16 |
| | C10 | −5.99E−05 | C26 | −5.1644E−09 | C43 | 2.81764E−12 | C60 | 4.00029E−17 |
| | C11 | −4.5381E−06 | C28 | −1.9091E−09 | C45 | −1.5444E−12 | C62 | −4.1764E−15 |
| | C13 | −7.3701E−06 | C30 | 2.60008E−11 | C47 | −3.3945E−15 | C64 | 1.05212E−15 |
| | C15 | −1.0002E−05 | C32 | 2.73923E−11 | C49 | 2.75972E−14 | C66 | −3.6542E−15 |

TABLE 11-continued

| Surface | | | Coefficient of free-form surface | | | | | |
|---|---|---|---|---|---|---|---|---|
| S22 | | C17 | −1.7327E−07 | C34 | −3.122E−10 | C51 | −3.8555E−14 |
| | K | 0 | | C19 | −1.5061E−07 | C36 | −6.1374E−10 | C53 | 2.3681E−13 |
| | C4 | 0.016645995 | C21 | 5.38912E−07 | C37 | 9.78887E−14 | C55 | 1.87115E−13 |
| | C6 | 0.021101685 | C22 | 8.11263E−10 | C39 | 1.08112E−12 | C56 | −9.9798E−17 |
| | C8 | 0.00032094 | C24 | −1.1477E−10 | C41 | 3.69407E−12 | C58 | −2.3837E−16 |
| | C10 | −5.1172E−05 | C26 | −4.8707E−09 | C43 | −5.8299E−13 | C60 | −2.2734E−16 |
| | C11 | −4.3183E−06 | C28 | −1.1809E−09 | C45 | −3.7079E−12 | C62 | −3.0547E−15 |
| | C13 | −8.5909E−06 | C30 | 3.39643E−11 | C47 | −2.9359E−15 | C64 | 5.55175E−15 |
| | C15 | −1.0155E−05 | C32 | 1.47622E−10 | C49 | −5.9302E−15 | C66 | −1.0145E−15 |
| S23 | | C17 | −2.203E−09 | C34 | 8.2099E−14 | C51 | −1.2799E−17 |
| | K | 0 | | C19 | 2.39237E−09 | C36 | −4.3614E−14 | C53 | 4.0335E−18 |
| | C4 | 0.002149003 | C21 | 1.39506E−09 | C37 | −1.7915E−16 | C55 | −3.2746E−18 |
| | C6 | 0.000317113 | C22 | 4.22192E−12 | C39 | 1.80308E−15 | C56 | 3.62609E−21 |
| | C8 | 2.85992E−05 | C24 | −3.3322E−11 | C41 | −2.7999E−15 | C58 | −3.5037E−20 |
| | C10 | 9.52914E−06 | C26 | 1.45814E−11 | C43 | 7.24461E−16 | C60 | 6.79833E−20 |
| | C11 | −8.2644E−08 | C28 | 1.00262E−11 | C45 | −1.0528E−15 | C62 | −3.7507E−20 |
| | C13 | 2.89938E−07 | C30 | 1.34005E−13 | C47 | −4.0973E−18 | C64 | 5.06597E−21 |
| | C15 | 1.20082E−07 | C32 | −3.6767E−13 | C49 | 1.4053E−17 | C66 | 5.93238E−21 |

Furthermore, the following TABLE 12 shows an inclination of and a magnitude of eccentricity of each surface in Example 3. A rule for representation of values of "ADE" and "YDE" in TABLE 12 is described above.

TABLE 12

| Surface | ADE (°) | YDE (mm) |
|---|---|---|
| S0 | −2.000 | 0.0 |
| S15 | 0.0 | 0.304 |
| S17 | 0.0 | −0.304 |
| S23 | 35.000 | 0.0 |

It is found from TABLE 12 that the condition described above is not met. However, Example 3 provides a construction in which a depth is correspondingly small and the depth is made preferential.

As illustrated in TABLE 12, a single lens composed of the surfaces "S15" and "S16" is made eccentric by −0.304 mm relative to an optical axis in the same manner as in Example 1. A magnitude of the eccentricity is minute and does not have a bad influence which makes the lens large in size, but the eccentricity realizes fine regulation of asymmetric chromatic aberration.

A value of a difference |L1−L2| of optical path lengths shown in Formula 1 is 0.62 times a height of an image plane of a screen and θs is 45 degrees, so that the condition described above is met.

It is found from TABLES 9 and 11 that a curvature "c" and a conic coefficient "k" in Example 3 are zero (0). A trapezoidal distortion caused by inclined incidence is generated extremely intensely in a direction of inclined incidence and a magnitude of distortion in a direction perpendicular thereto is small. Accordingly, there is a need for considerably different functions in the direction of inclined incidence and in the direction perpendicular thereto, and graphic distortion can be favorably corrected by making no use of the curvature "c" and the conic coefficient "k", which are of rotational symmetry and function omnidirectionally.

An effective range according to Example 3 magnifies and projects a range on an object surface (a ratio of 16:9) onto an image surface (50"+over-scan: 1210.7×681.0 mm). It is found in this example that even with a relatively small distance (Lp), an object surface can be magnified and projected onto a sufficiently large image plane. Thus, an excellent magnifying power of projection is resulted.

EXAMPLE 4

Example 4 according to the invention will be described with reference to TABLES 13 to 16. A light outgoing from an image display element 1 passes through a forward lens group 2 of a lens optical system, which is composed of transmission lenses having a surface configuration of rotational symmetry, and a rear lens group 3 of the lens optical system, which is composed of transmission lenses having a free-form surface configuration, in this order, and then is reflected by a reflecting surface 4 of a reflecting optical system, which has a free-form surface configuration, to be incident on a screen 5.

The forward lens group 2 of the lens optical system is composed of refractive surfaces, all of which have a configuration of rotational symmetry, four out of the refractive surfaces being aspheric surfaces of rotational symmetry, and the remaining surfaces are spherical surfaces. Aspheric surfaces of axial symmetry used herein are represented by Formula 1 described above with the use of a local cylindrical coordinates system every surface. Free-form surfaces, which constitute the rear lens group 3 of the lens optical system, are also represented by Formula 2 described above, which includes a polynomial of x and y, with the use of local rectangular coordinate systems (x, y, z), origins of which are positioned on apices of respective surfaces.

The following TABLE 13 indicates lens data in Example 4, surface numbers include "S0" for an object surface and "S1" to "S24" in this order, and "S25" denotes an image surface. In TABLE 13, "Rd" indicates a radius of curvature of each surface, which is represented by a positive value in the case where a center of curvature is located on the left of an associated surface in FIG. 13 or 16, and by a negative value in the reverse case.

TABLE 13

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 4.97 | | |
| S3 | 49.017 | 4.65 | 1.85306 | 17.2 |
| S4 | 201.672 | 18.00 | | |
| S5 * | −60.233 | 9.00 | 1.49245 | 42.9 |
| S6 * | −55.360 | 0.10 | | |
| S7 | 56.669 | 9.32 | 1.49811 | 60.9 |
| S8 | −27.651 | 2.50 | 1.76014 | 20.0 |
| S9 | 46.949 | 0.10 | | |
| S10 | 47.407 | 9.00 | 1.49811 | 60.9 |
| S11 | −46.719 | 25.90 | | |

TABLE 13-continued

| Surface | Rd | TH | nd | vd |
|---|---|---|---|---|
| S12 | Infinity | 9.10 | | |
| S13 | −9457.081 | 6.00 | 1.85306 | 17.2 |
| S14 | −64.870 | 65.00 | | |
| S15 | −42.429 | 4.19 | 1.74702 | 33.2 |
| S16 | 137.716 | 9.00 | | |
| S17 * | −34.874 | 10.00 | 1.49245 | 42.9 |
| S18 * | −63.364 | 2.50 | | |
| S19 # | Infinity | 8.00 | 1.49245 | 42.9 |
| S20 # | Infinity | 19.55 | | |
| S21 # | Infinity | 8.00 | 1.49245 | 42.9 |
| S22 # | Infinity | 121.95 | | |
| S23 # | Infinity | −742.00 | REFL | |

"TH" in TABLE 13 indicates a face-to-face distance, which corresponds to a distance to an apex of a subsequent lens surface from an apex of an associated lens surface. The face-to-face distance is represented by a positive value when a subsequent lens surface is located on the left of an associated lens surface, and by a negative value when a subsequent lens surface is located on the right.

In TABLE 13, "S5", "S6", "S17", and "S18" denote aspheric surfaces of rotational symmetry, which are intelligibly indicated by "*" added laterally of a surface number in TABLE 13, and coefficients of the four aspheric surfaces are indicated in the following TABLE 14.

TABLE 14

| Surface | | | Coefficient of aspheric surface | | | | | |
|---|---|---|---|---|---|---|---|---|
| S5 | K | −7.49933947 | C | 8.20794E−12 | F | 1.67212E−19 | J | 2.75191E−26 |
| | A | −4.2871E−06 | D | −3.3905E−14 | G | 1.22978E−22 | | |
| | B | 1.47929E−08 | E | 5.30418E−18 | H | −9.2584E−24 | | |
| S6 | K | −5.10683146 | C | 2.31215E−12 | F | 1.4876E−19 | J | 1.40237E−26 |
| | A | −4.215E−08 | D | −8.8141E−15 | G | −2.1285E−21 | | |
| | B | 9.97857E−09 | E | 2.96852E−17 | H | 3.39217E−25 | | |
| S17 | K | 2.729972673 | C | −6.3329E−11 | F | −5.5239E−19 | J | 2.95633E−25 |
| | A | −6.7402E−06 | D | 3.24143E−13 | G | −2.1415E−20 | | |
| | B | −1.1095E−08 | E | 1.38117E−15 | H | −4.6503E−23 | | |
| S18 | K | 5.628556104 | C | 2.5008E−11 | F | −6.694E−20 | J | 4.08388E−28 |
| | A | −1.8686E−06 | D | 1.72887E−14 | G | −5.6024E−23 | | |
| | B | −1.1602E−08 | E | −2.9081E−17 | H | 5.15556E−26 | | |

"S19" to "S22" in TABLE 13 denote refractive surfaces having a free-form surface configuration and constituting a rear lens group 3 of the lens optical system and "S23" denotes a reflecting surface of the reflecting optical system, which has a free-form surface configuration and is indicated by "#" added laterally of a surface number. The following TABLE 15 indicates values of coefficients representative of the five free-form surface configurations.

TABLE 15

| Surface | | | | | Coefficient of free-form surface | | | |
|---|---|---|---|---|---|---|---|---|
| S19 | | | | C17 | 3.06092E−07 | C34 | −1.504E−09 | C51 | 1.89916E−12 |
| | K | 0 | | C19 | 2.31689E−06 | C36 | 9.24213E−10 | C53 | −2.6408E−12 |
| | C4 | −0.00523704 | | C21 | 3.17855E−07 | C37 | 2.73895E−12 | C55 | −2.2305E−12 |
| | C6 | 0.022327058 | | C22 | −2.18E−09 | C39 | −5.7332E−11 | C56 | −2.3991E−15 |
| | C8 | −0.00076156 | | C24 | −1.35E−08 | C41 | −6.5197E−11 | C58 | 2.74339E−14 |
| | C10 | −0.00059005 | | C26 | −4.4124E−09 | C43 | −1.4355E−10 | C60 | 9.09554E−14 |
| | C11 | 4.88728E−06 | | C28 | 2.72086E−08 | C45 | −2.1121E−11 | C62 | 2.42098E−14 |
| | C13 | 1.92499E−05 | | C30 | −4.0242E−10 | C47 | 4.94771E−14 | C64 | 1.85581E−13 |
| | C15 | −1.9167E−05 | | C32 | −2.6688E−09 | C49 | 5.78829E−13 | C66 | −1.2907E−13 |
| S20 | | | | C17 | 4.41515E−08 | C34 | −2.1067E−09 | C51 | 1.36481E−13 |
| | K | 0 | | C19 | 2.59357E−06 | C36 | −1.3645E−09 | C53 | −1.7814E−12 |
| | C4 | −0.00380713 | | C21 | 1.34672E−06 | C37 | 2.55427E−12 | C55 | 1.48598E−12 |
| | C6 | 0.034310744 | | C22 | −6.3335E−10 | C39 | −3.0724E−11 | C56 | −1.1411E−15 |
| | C8 | −0.00082075 | | C24 | −3.2842E−08 | C41 | 9.74292E−11 | C58 | 1.71485E−14 |
| | C10 | −0.00096306 | | C26 | −9.4354E−08 | C43 | 5.80355E−11 | C60 | 1.60064E−14 |
| | C11 | 1.46478E−06 | | C28 | 5.63114E−08 | C45 | −1.3903E−10 | C62 | −1.6566E−13 |
| | C13 | 2.57064E−05 | | C30 | −1.5828E−10 | C47 | 7.97383E−14 | C64 | 1.4173E−13 |
| | C15 | −3.3719E−05 | | C32 | −9.3186E−10 | C49 | −2.2316E−13 | C66 | 5.32957E−14 |
| S21 | | | | C17 | −1.4847E−07 | C34 | −1.578E−10 | C51 | −3.1391E−14 |
| | K | 0 | | C19 | −4.1463E−08 | C36 | −3.154E−10 | C53 | 4.92021E−14 |
| | C4 | 0.01628158 | | C21 | 3.75928E−07 | C37 | 1.44753E−13 | C55 | −1.2229E−14 |
| | C6 | 0.024536292 | | C22 | 8.73333E−10 | C39 | 1.02001E−12 | C56 | −1.1929E−16 |
| | C8 | 0.000287791 | | C24 | −1.3318E−09 | C41 | 4.04083E−12 | C58 | −1.9881E−16 |
| | C10 | −5.6467E−05 | | C26 | −5.0191E−09 | C43 | 2.15125E−12 | C60 | −1.1661E−16 |
| | C11 | −4.4889E−06 | | C28 | −1.338E−09 | C45 | 1.05501E−13 | C62 | −3.9789E−15 |
| | C13 | −7.4216E−06 | | C30 | 2.11331E−11 | C47 | −1.2171E−15 | C64 | 1.92077E−15 |
| | C15 | −9.5063E−06 | | C32 | 3.73498E−11 | C49 | 1.57629E−14 | C66 | −5.4374E−15 |

TABLE 15-continued

| Surface | | | Coefficient of free-form surface | | | | | |
|---|---|---|---|---|---|---|---|---|
| S22 | | C17 | −1.7539E−07 | C34 | −2.5651E−10 | C51 | −3.1411E−14 |
| | K | 0 | C19 | −1.5271E−07 | C36 | −6.0608E−10 | C53 | 2.14522E−13 |
| | C4 | 0.016419443 | C21 | 5.09788E−07 | C37 | 1.26957E−13 | C55 | 1.76045E−13 |
| | C6 | 0.021115451 | C22 | 7.02901E−10 | C39 | 1.00917E−12 | C56 | −9.5762E−17 |
| | C8 | 0.000323178 | C24 | −1.3689E−10 | C41 | 3.91234E−12 | C58 | −2.6471E−16 |
| | C10 | −4.5525E−05 | C26 | −4.0137E−09 | C43 | −1.1163E−12 | C60 | −2.2728E−16 |
| | C11 | −4.138E−06 | C28 | 1.70813E−10 | C45 | −4.4694E−12 | C62 | −3.086E−15 |
| | C13 | −9.223E−06 | C30 | 2.82551E−11 | C47 | −7.7346E−16 | C64 | 5.99803E−15 |
| | C15 | −9.9105E−06 | C32 | 1.42902E−10 | C49 | −1.2051E−14 | C66 | −1.1247E−15 |
| S23 | | C17 | −2.5231E−09 | C34 | 7.66238E−14 | C51 | −2.3328E−17 |
| | K | 0 | C19 | 2.58369E−09 | C36 | 3.37658E−15 | C53 | 1.85177E−17 |
| | C4 | 0.002289792 | C21 | 1.24861E−09 | C37 | −1.5632E−16 | C55 | −4.0416E−18 |
| | C6 | 0.000330451 | C22 | 4.81491E−12 | C39 | 2.15761E−15 | C56 | 1.15938E−21 |
| | C8 | 3.09058E−05 | C24 | −3.7371E−11 | C41 | −3.7026E−15 | C58 | −3.3248E−20 |
| | C10 | 1.02245E−05 | C26 | 1.56104E−11 | C43 | 1.35291E−15 | C60 | 7.75597E−20 |
| | C11 | −9.5057E−08 | C28 | 7.8498E−12 | C45 | −3.329E−16 | C62 | −8.1537E−20 |
| | C13 | 3.1048E−07 | C30 | 1.56487E−13 | C47 | −4.2776E−18 | C64 | 8.41917E−20 |
| | C15 | 1.27367E−07 | C32 | −4.1734E−13 | C49 | 1.73654E−17 | C66 | −2.3609E−20 |

Furthermore, the following TABLE 16 shows an inclination of and a magnitude of eccentricity of each surface in the Example. A rule for representation of values of "ADE" and "YDE" in TABLE 16 is described above and inclinations of respective surfaces in the Example are substantially the same in magnitude as those in Example 1.

TABLE 16

| Surface | ADE (°) | YDE (mm) |
|---|---|---|
| S0 | −2.000 | 0.0 |
| S15 | 0.0 | 0.230 |
| S17 | 0.0 | −0.230 |
| S23 | 35.000 | 0.0 |

It is found from TABLE 16 that the condition described above is not met. In the Example, however, a depth is correspondingly small and the depth is made preferential.

On the other hand, according to Example 4, the surface "S15" is made eccentric by −0.23 mm and the surface "S17" is made reversely eccentric by 0.23 mm as illustrated in TABLE 16. In the case where a certain surface is made eccentric, optical axes of succeeding surfaces are shifted a magnitude of the eccentricity. Accordingly, "S15" and "S17" being made eccentric thus means that a single lens composed of "S15" and "S16" is made eccentric by −0.193 mm relative to an optical axis. A magnitude of the eccentricity is minute and does not have a bad influence, which makes the lens large in size, but the eccentricity realizes fine regulation of asymmetric chromatic aberration.

Furthermore, a value of a difference |L1−L2| of optical path lengths is 0.64 times a height of the image plane of the screen and "θs" is 45 degrees, so that the condition of Formula 1 described above is met.

It is found from TABLES 13 and 15 that a curvature "c" and a conic coefficient "k" in Example 4 are zero (0). A trapezoidal distortion caused by inclined incidence is generated extremely intensely in a direction of inclined incidence and a magnitude of distortion in a direction perpendicular thereto is small. Accordingly, there is a need for considerably different functions in the direction of inclined incidence and in the direction perpendicular thereto, and graphic distortion can be favorably corrected by making no use of the curvature "c" and the conic coefficient "k", which are of rotational symmetry and function omnidirectionally.

An effective range according to the Example magnifies and projects a range on an object surface (a ratio of 16:9) onto an image surface (60"+over-scan: 1452.8×817.2 mm). That is, it is found that even with a relatively small distance (Lp), an object surface can be magnified and projected onto a sufficiently large image plane. Thus, an excellent magnifying power of projection is resulted.

Figure 19:
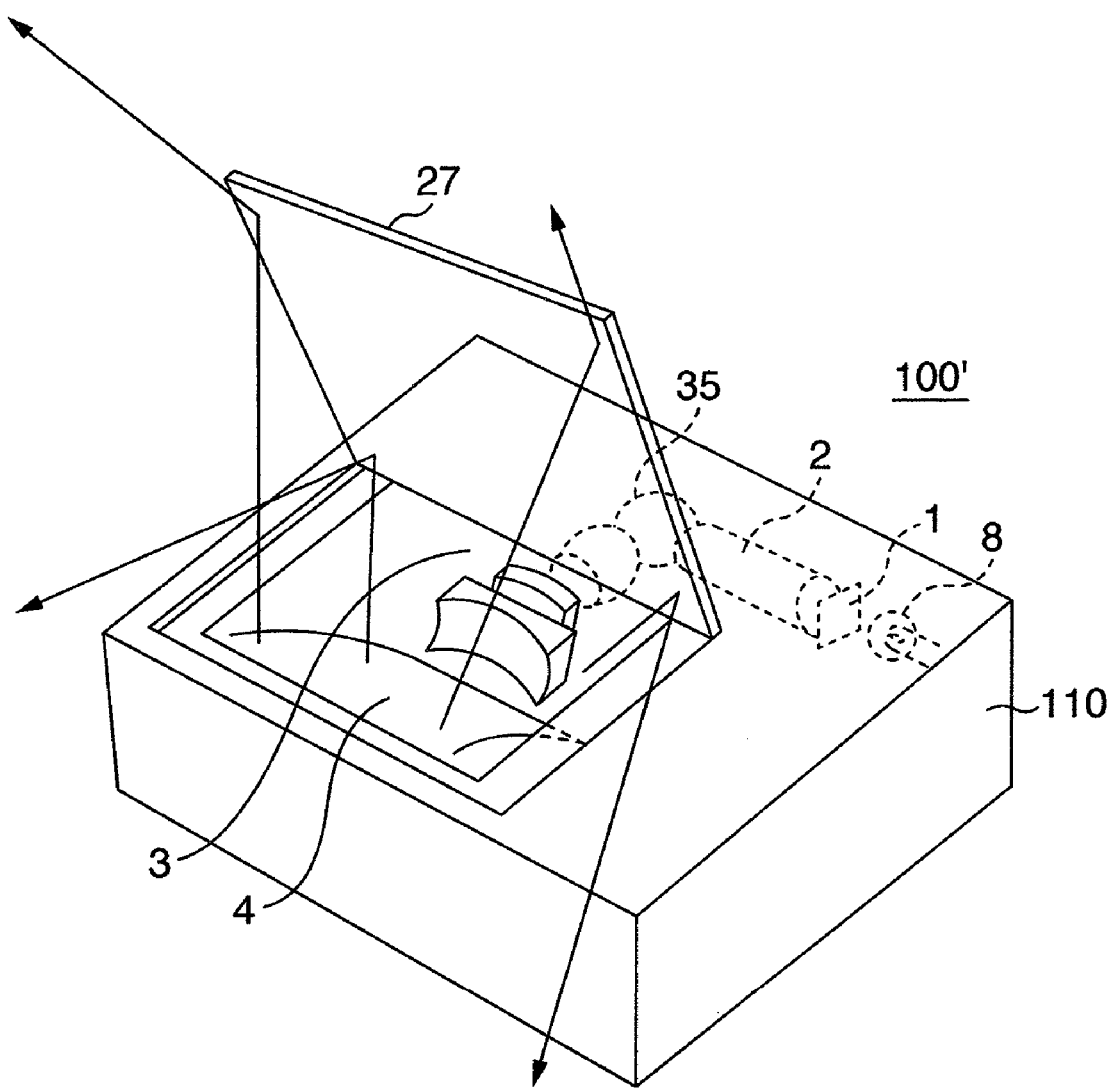
FIG. 19 is a perspective view showing a whole configuration of a projection display unit according to a still further embodiment.

FIG. 19 shows a further construction of the projection display unit. As apparent from the figure, a projection display unit 100' of the further construction further arranges a planar reflecting mirror 27 on an optical path between the reflecting mirror 4 having a free-form surface and the screen 5 to form a projection optical unit, in addition to the construction of the projection optical unit of the projection display unit shown in FIG. 10 or 14. In addition, in the arrangement shown in the figure, the planar reflecting mirror 27 serves also as a lid to cover an opening formed on an upper surface of a unit housing 110 corresponding to the reflecting mirror 4 having a free-form surface, and is provided above the opening to enable opening and closing.

Figure 20:
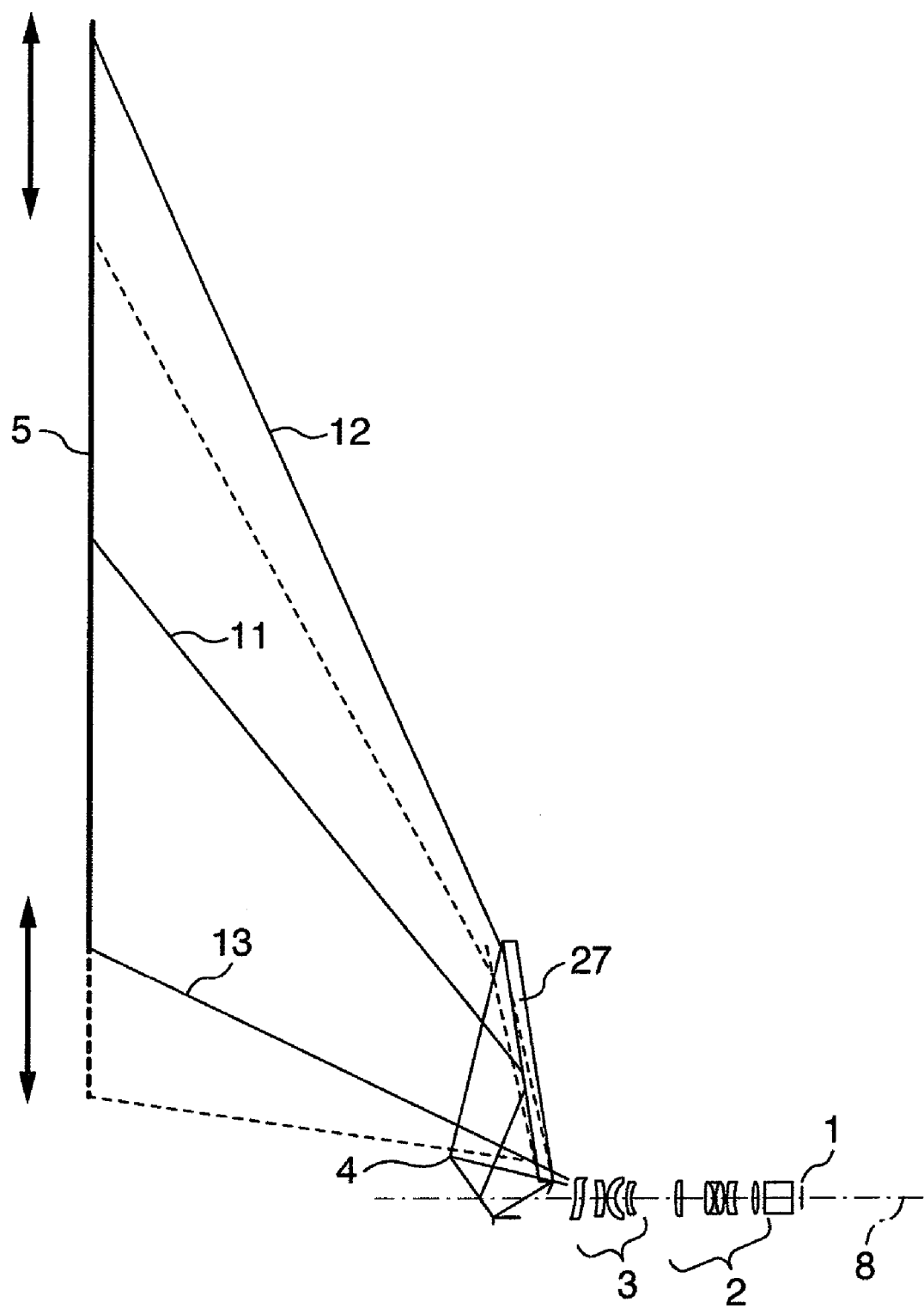
FIG. 20 is a cross sectional view showing a fundamental configuration of a projection optical unit in a projection display unit according to the still further embodiment.

With the construction of such projection optical unit, a light outgoing through the prism 10 from an image display element 1 is first incident on a forward lens group 2, which constitutes a lens optical system, as shown in FIG. 20. Thereafter, a light outgoing from the forward lens group 2 passes a rear lens group 3 composed of a plurality of lenses including a plurality (two in this example) of lenses having a free-form surface configuration, in which at least one surface is not of rotational symmetry (rotational asymmetry). The light outgoing from the rear lens group 3 is magnified and reflected by a reflecting optical system including a reflecting mirror (referred below to as free-form surface mirror) 4 having a reflecting surface of free-form surface configuration, which is not of rotational symmetry, and then is reflected further by the planar reflecting mirror 27 to be projected onto a predetermined screen 5 (for example, a wall surface of a room, a sheet-shaped screen, etc.). As apparent from the figure, the light is projected in an opposite direction to that in the Examples (for example, FIGS. 11 and 13). Based on this, with the construction of the projection optical unit of the projection display unit 100' of the further Embodiment, an optical path to the screen 5 from the free-form surface mirror 4 is turned back by the planar reflecting mirror 27. Thus, the construction can make a distance to the screen 5 further small and is preferable in enabling realizing an increase in angle of view.

As shown by broken lines in FIG. 20, with the projection optical unit, the planar reflecting mirror 27 is structured to enable regulating its angle of inclination by a minute angle.

With the structure, a position of a projected image on the screen 5 can be changed up and down by changing an angle of inclination of the planar reflecting mirror 27, and a preferred function can be provided especially in a projection display unit. In addition, the planar reflecting mirror 27 can be regulated in angle of inclination by a user according to the status of use of the projection display unit, or can be structured so that it is moved (raised) by a drive mechanism, which includes an electric motor, etc. and is not shown herein, from a position, in which it covers the opening on the upper surface of the unit housing 110, and arranged to be inclined at an angle set by a user.

With the projection display unit according to the embodiments of the invention described above, a projected image (picture image) from the image display element 1 outgoes from the projection optical unit to be reflected by the freeform surface mirror 4, or is further reflected by the planar reflecting mirror 27 to be projected onto the screen 5. Therefore, it is necessary to correctly position the unit 100, 100' relative to the screen 5, onto which a projected image (picture image) is projected. In order to especially suppress distortion and aberration generally to a minimum to obtain a favorable projected image plane, it is important to regulate an arrangement of the unit so that the central light beam in the image-plane shown in FIG. 14 becomes perpendicular to the surface of the screen 5.

As described above, since it is unnecessary to make a lens as used eccentric as in the related art, a projection display unit is provided in which an additional optical unit having a large aperture is not needed, and an increase in angle of view is enabled. Thus, it is possible to suppress distortion to a minimum even when a position relative to a screen is changed, and which is relatively easy to be manufactured. According to the invention, by projecting an image from the projection display unit onto the screen 5, it is possible to obtain a favorable projected image plane, on which distortion and aberration are generally suppressed to a minimum, in a large screen, thus enabling realizing an excellent projected image plane.

Hereupon, the invention provides a projection display system, which makes use of the projection display unit 100 or 100' (referred below to as projection display unit 100 collectively) to magnify and project an image of an image display element onto a projection surface such as the screen 5, etc. to display the image and which enables displaying a projected image in a large screen without distortion. A projection display system composed of the screen 5, which constitutes a further part of the system, together with the projection display unit described above will be described below in detail with reference to FIGS. 1A to 9B.

Figure 1A:
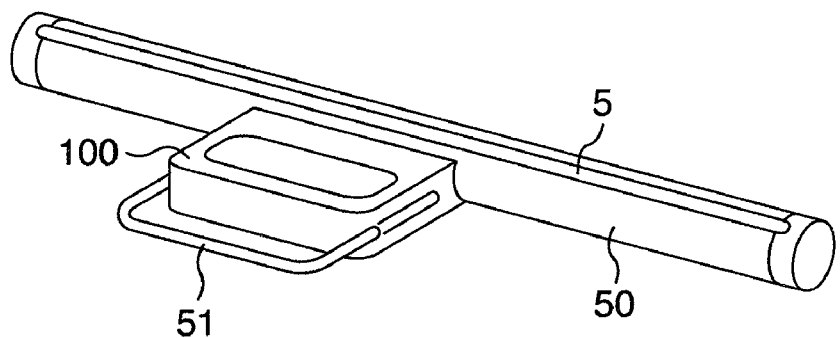
FIG. 1A is a view showing a whole configuration in which a projection display system according to the invention is applied to a projector, and a state in which a screen is wound.
Figure 1B:
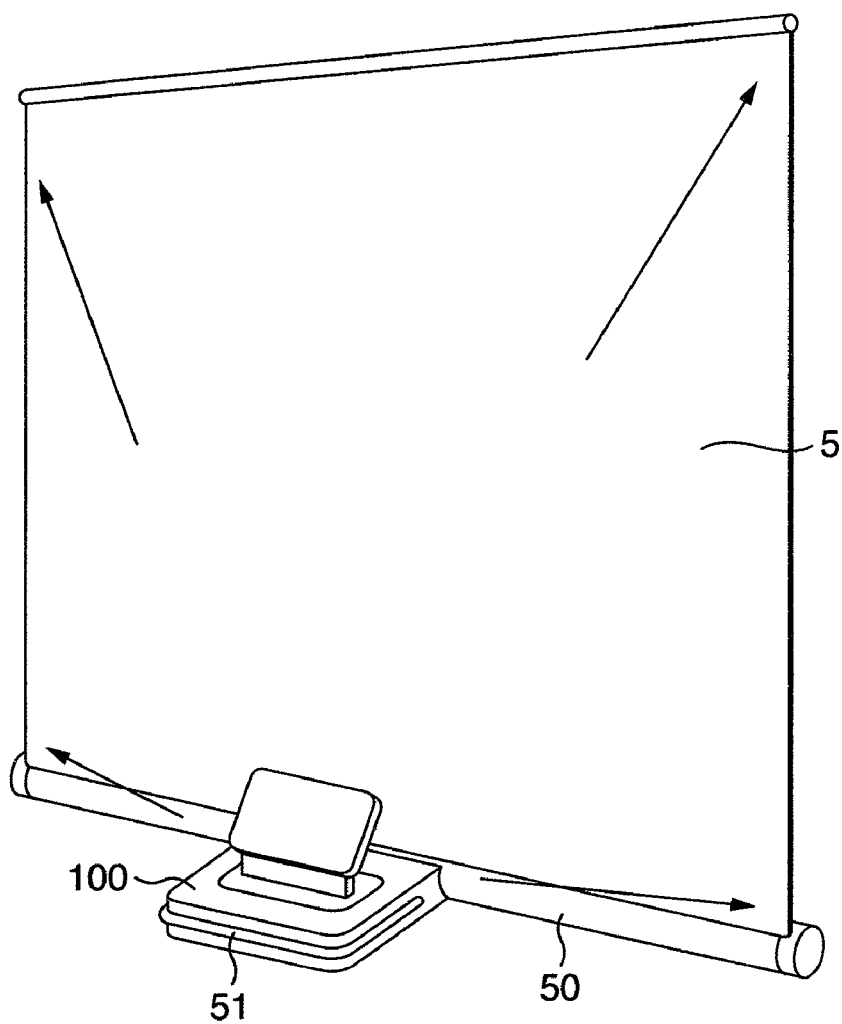
FIG. 1B is a view showing the projector of FIG. 1A in a state in which the screen is unwound.

FIGS. 1A and 1B show a projection display system of a so-called projector type, in which the projection display unit 100 is formed integral with a portable screen 5. As shown in FIG. 1A, a cylindrical-shaped case 50, in which a sheet-shaped projection screen 5 is accommodated in a foldable manner (that is, wound), is fixed integrally on a part of, specifically, a side of the projection display unit 100. The reference numeral 51 in these figures denotes a portable handle provided on a part of the projection display unit 100 to facilitate transportation, especially in the case where the projection screen 5 is formed integrally.

When using the projection display system, as shown in FIG. 1B, the projection display unit 100 and the screen 5 (specifically, the case 50), which are made integral with each other, are fixed in a predetermined position on a plane, then the screen 5 is taken out from the case 50 (upward in the figure), and an image from the projection display unit 100 is projected onto a projection plane on the screen 5 whereby it is possible to obtain a favorable projected image, on which distortion and aberration are generally suppressed to a minimum. The projection display unit 100 and the screen 5 (specifically, the case 50) are not needed to be made integral with each other but can be constructed detachably by a connection mechanism, in which case transportation is made convenient. The projection display unit 100 is preferably arranged substantially centrally in a width direction of the screen 5 (specifically, the case 50) and preferably mounted along a plane extending in a direction perpendicular to a projection plane thereof when the screen 5 is spread.

The projection display unit 100 inputs thereinto, for example, an image of a movie as televised and is arranged on a table or an AV rack arranged along a wall in, for example, a user's room (for example, a living room) to project the picture image onto the screen 5, whereby it becomes possible to simply realize a home theater. In addition, while the example is described with respect to the case where an image is projected onto the screen 5, an associated wall surface is made use of to enable projection of an image. In the example, a large screen of 60 inches or larger can be obtained simply by arranging the projection display system on an AV rack having a width in the order of 45 cm. In this manner, since a favorable projected image can be obtained even with an ultra short focus (that is, projection is performed from substantially just under the screen 5), a space is efficiently made use of even in a narrow room to enable enjoying a large screen, which appeals a lot.

Figure 3:
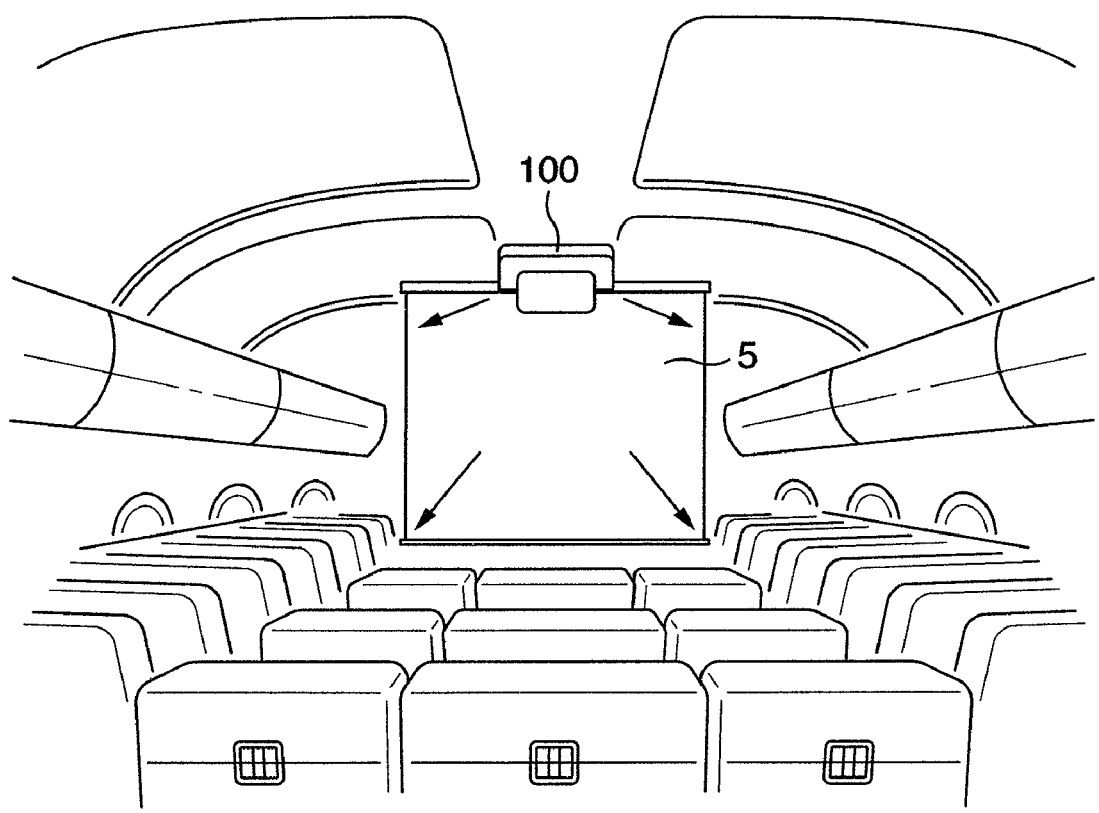
FIG. 3 is a view showing a configuration in which the projection display system according to the invention is adopted in an interior of an airplane.

Alternatively, it is possible to arrange the projection display system on a ceiling (ceiling suspended arrangement) as shown in FIG. 3. The projection display unit 100 shown in FIG. 10 is mounted upside down to a ceiling. Then, the screen 5 is taken out from the case 50, which is mounted integrally to the unit (in addition, taken downward in this case) to be fixed whereby it is possible to project a large image plane onto the screen 5 even in a narrow space such as that in airplanes (passenger airplanes), sightseeing buses, intercity buses, etc.

Figure 4:
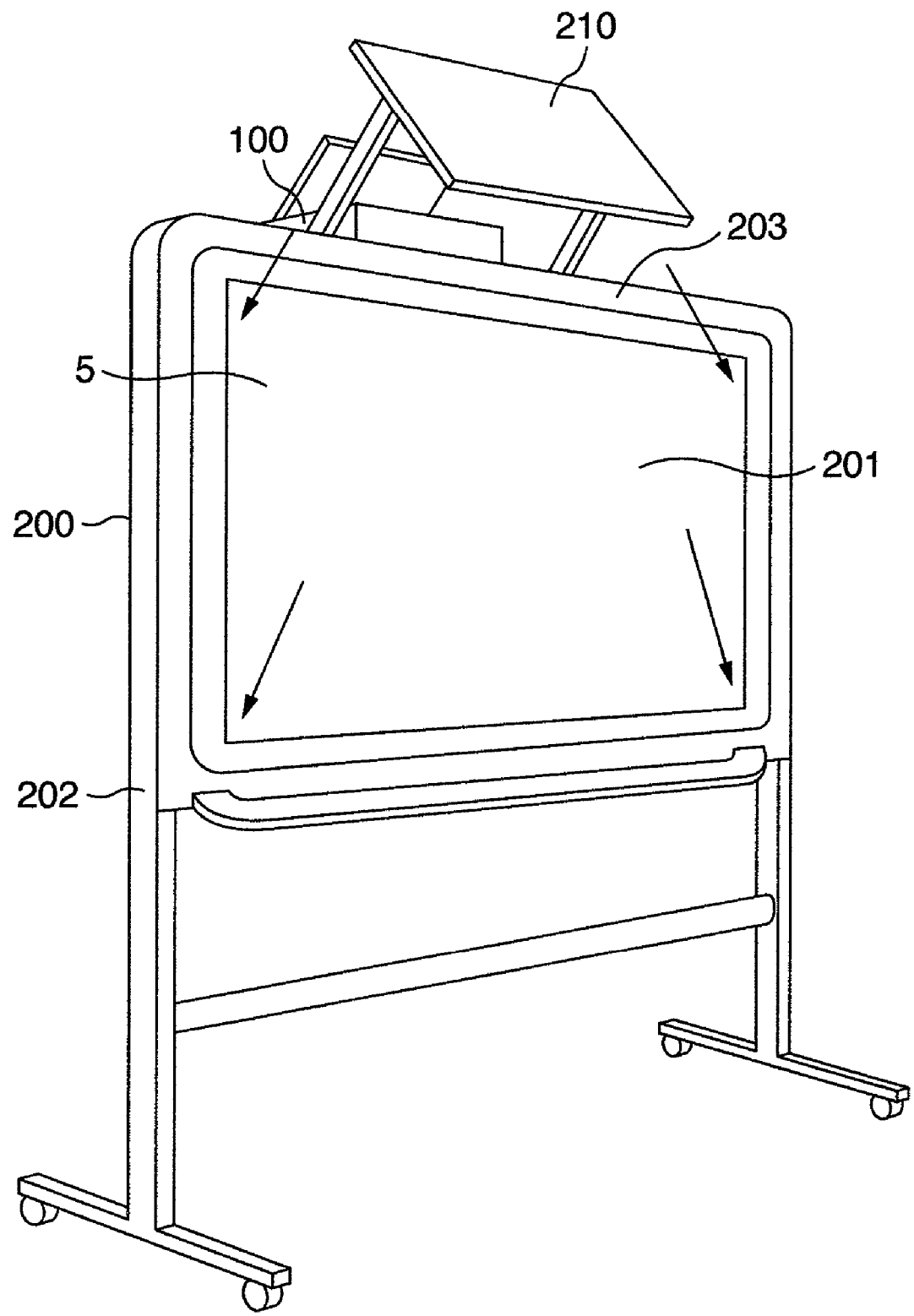
FIG. 4 is a view showing a configuration in which the projection display system according to the invention is adopted for a white board.
Figure 5A:
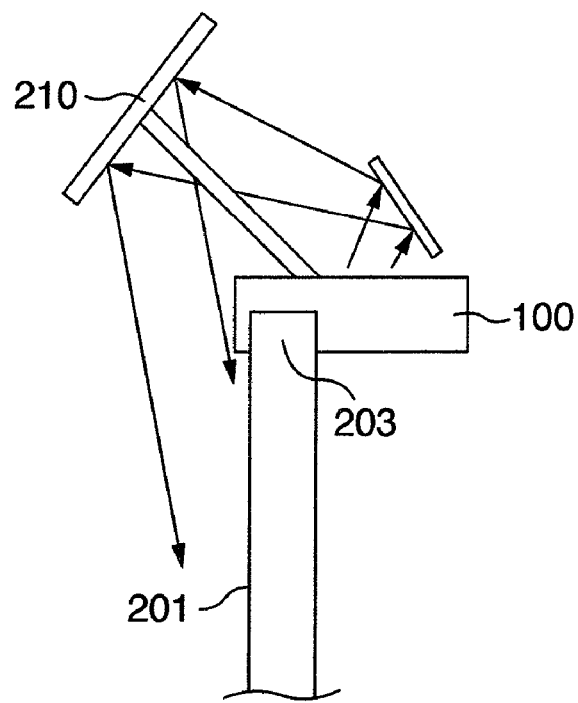
FIG. 5A is a view showing a detailed structure of an upper portion of the white board shown in FIG. 4.
Figure 5B:
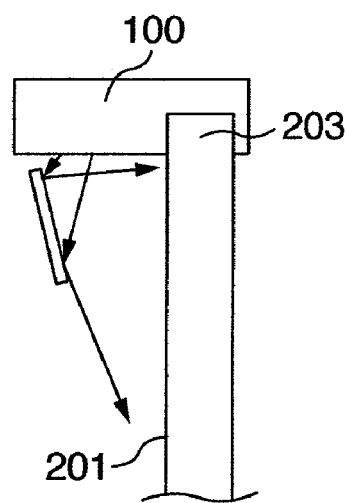
FIG. 5B is a view showing a detailed structure of an upper portion of a white board of FIG. 4, to which the projection display system is mounted in a reverse manner to that in FIG. 5A.

Furthermore, it is possible to form a projection display system, which is made integral with a so-called white board 200 to project a large image plane onto a surface 201 of the white board as shown in, for example, FIG. 4, as a projection display system of a projector type, in which the projection display unit 100 is formed integral with the portable screen 5. In this case, the projection display unit 100 is preferably arranged on a part of a frame 202 of the white board 200, in particular, substantially centrally of an upper side 203 thereof. In a mount construction, as shown in FIG. 5A, the projection display unit 100 shown in FIG. 10 may be mounted intact in a direction perpendicular to the projection plane (the surface 201 of the white board 200). Furthermore, a mirror 210, by which a projected image from the unit is projected downward, may be mounted, or the projection display unit 100 may be mounted upside down (the mirror 210 is dispensed with in this case) as shown in FIG. 5B. In the case where a projection display system is made integral with the white board 200, in particular, the projection display unit 100 is preferably arranged on the upper side 203 of the frame 202 as described above since a user frequently explains or writes standing on a side of the surface 201.

Figure 6:
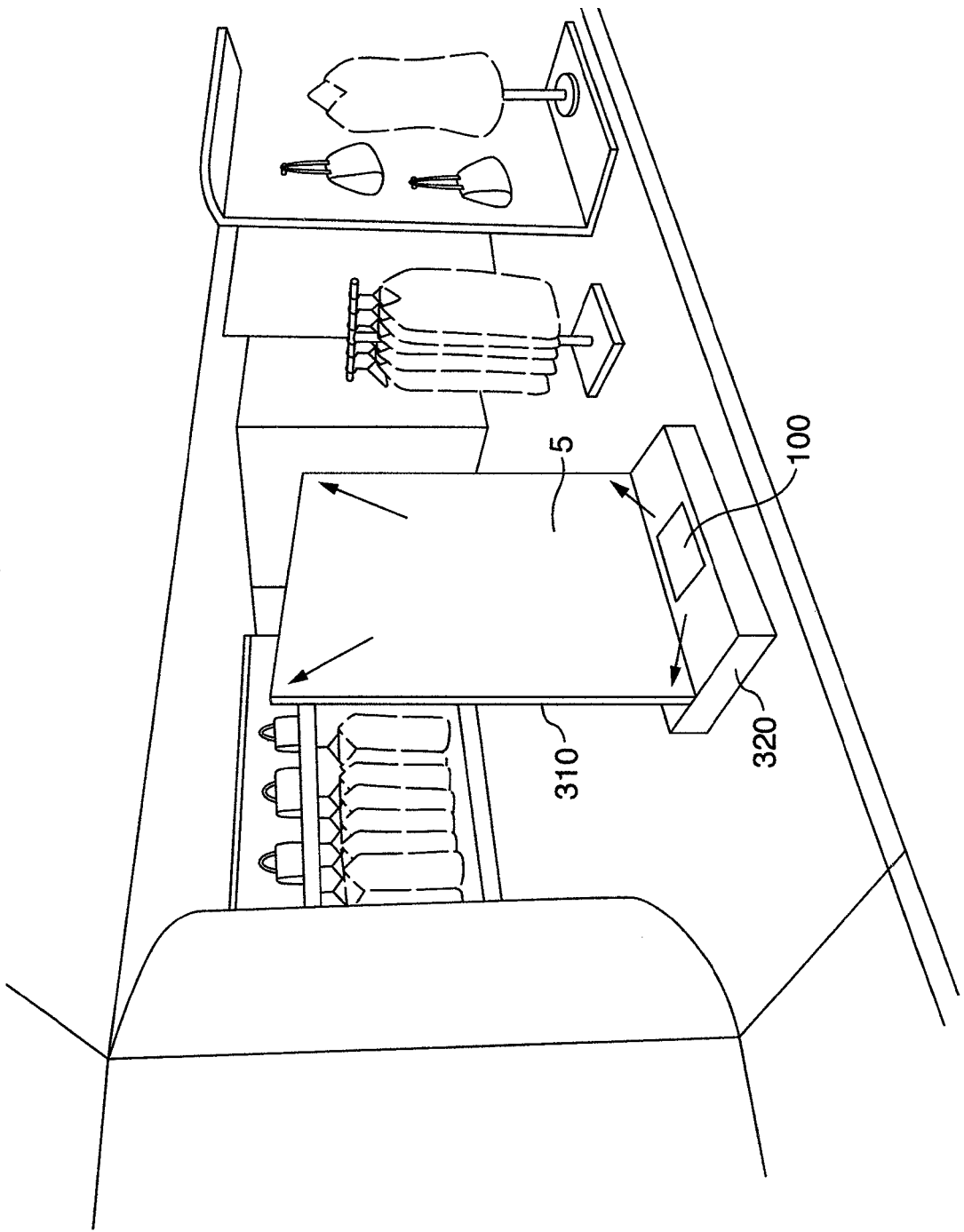
FIG. 6 is a view showing a configuration in which the projection display system according to the invention is arranged in a part of a shop.
Figure 7:
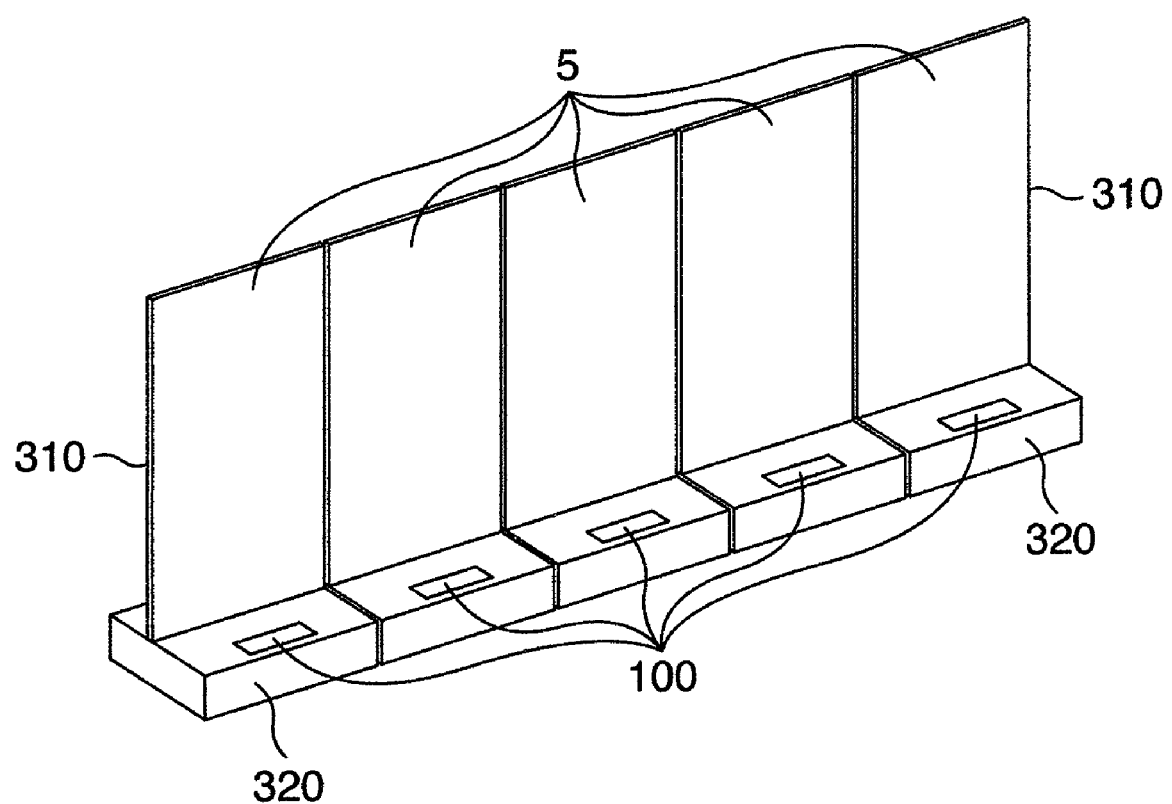
FIG. 7 is a view showing a further configuration in which the projection display system according to the invention is arranged in a part of a shop.
Figure 8:
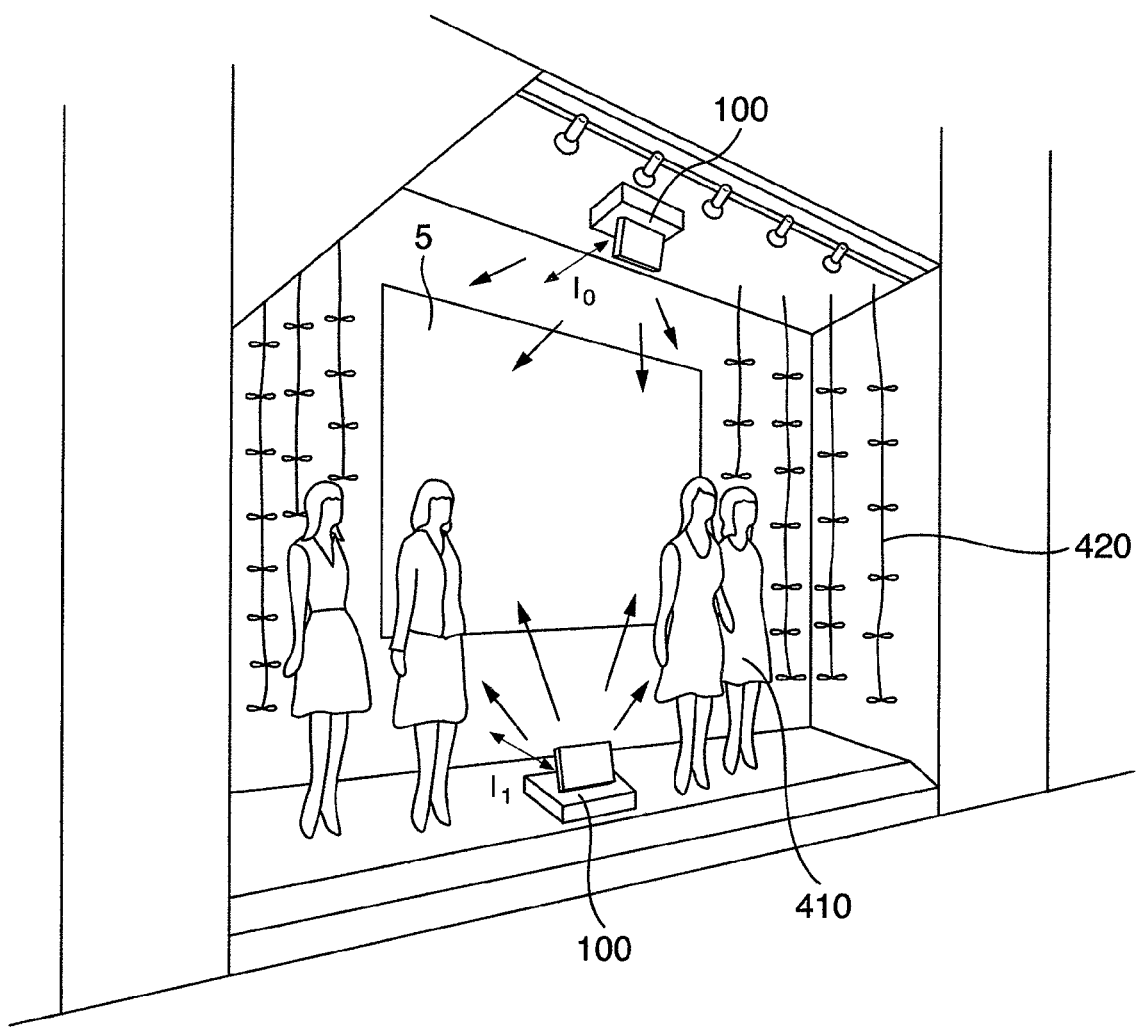
FIG. 8 is a view showing a still further configuration in which the projection display system according to the invention is arranged in a part of a shop.

FIGS. 6 to 8 show a configuration in which the projection display system according to the invention is arranged on a part of a shop and a large screen thereof is made use of to show, for example, a guide of entertainments and an advertisement. With the projection display system according to the invention, a favorable projection plane can be obtained even with an ultra short focus (that is, projection is performed from substantially just under the screen 5), so that it is possible to incorporate the projection display unit 100 in a pedestal 320, on which a notice board 310 is built, whereby it is possible to simply notify a guide of entertainments and an advertisement in space saving and in a large screen at an inlet of a shop or at a shop front without the need of such equipment as ceiling suspension, etc. In particular, since the projection display system according to the invention can display not only a still image but also a dynamic image in a large screen depending on input thereinto, it is suited to a display of seasonal entertainments at an inlet of a shop or a display of a commercial projected image of a fashion show at a boutique shop front.

The construction of the projection display system described above functions stand-alone, and thus it is apparent that various notices can be given in various scenes only by exchanging the contents of the display. Alternatively, it is possible to laterally assemble a plurality of the projection display systems having the construction described above to make a display of multi-screen as shown in, for example, FIG. 7. In addition, in this case, representation by a dynamic image, which is difficult in conventional posters, is enabled and so a further effective advertising effect can be expected. It is also possible to arrange the projection display unit 100 above a screen instead of assembling it in the pedestal 320.

A further effective advertising effect can be produced in the projection display system described above by projecting a large image onto a screen or a wall surface in, for example, a show window, which is limited in depth, as shown in FIG. 8. Conventionally, an ordinary display in a show window relies on a still image (graphic) together with a decoration 420, which includes mannequins 410. Since options such as display of an image by the projection display system are added, representation is widened. In addition, in the example, a plurality (two in this example) of the projection display units 100 are arranged, one of them being suspended from a ceiling to enable a quiet mount, and the other being placed on a floor so as to enable simple use.

With the projection display system according to the invention, while not shown herein, the projection display units 100 can be arranged not only vertically of the screen 5 but also left and right thereof. The plurality of the projection display units 100 arranged vertically of or left and right of the screen 5 may project the same image, or different images to enable composing them on a screen. In this manner, since a projected image obtained on the screen 5 is increased in quantity of light especially in the case where the plurality of the projection display units 100 are used, a further bright projected image is obtained. Furthermore, as shown by "$l_0$" and "$l_1$" in the figure, a distance from the screen 5 is set at different values ($l_0 \neq l_1$) whereby respective projected images can be changed in size to be composed and displayed, so that representation of a display is widened.

Figure 9A:
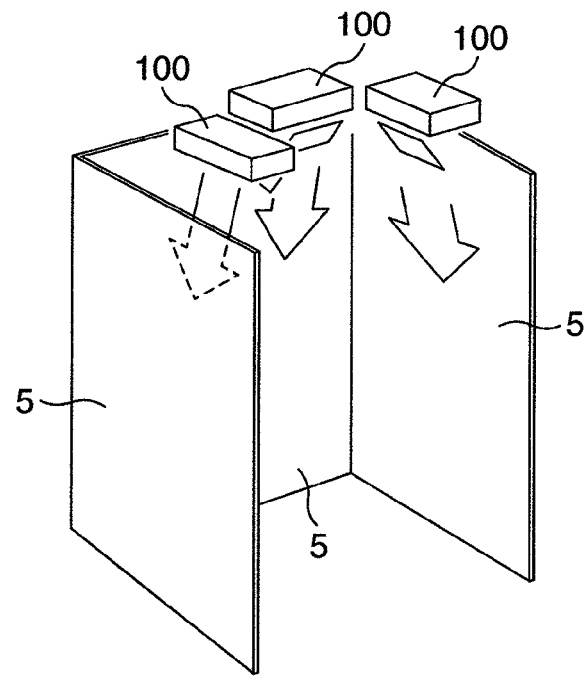
FIG. 9A is a view showing a configuration in which the projection display system according to the invention is arranged in a game center and a simulation equipment.
Figure 9B:
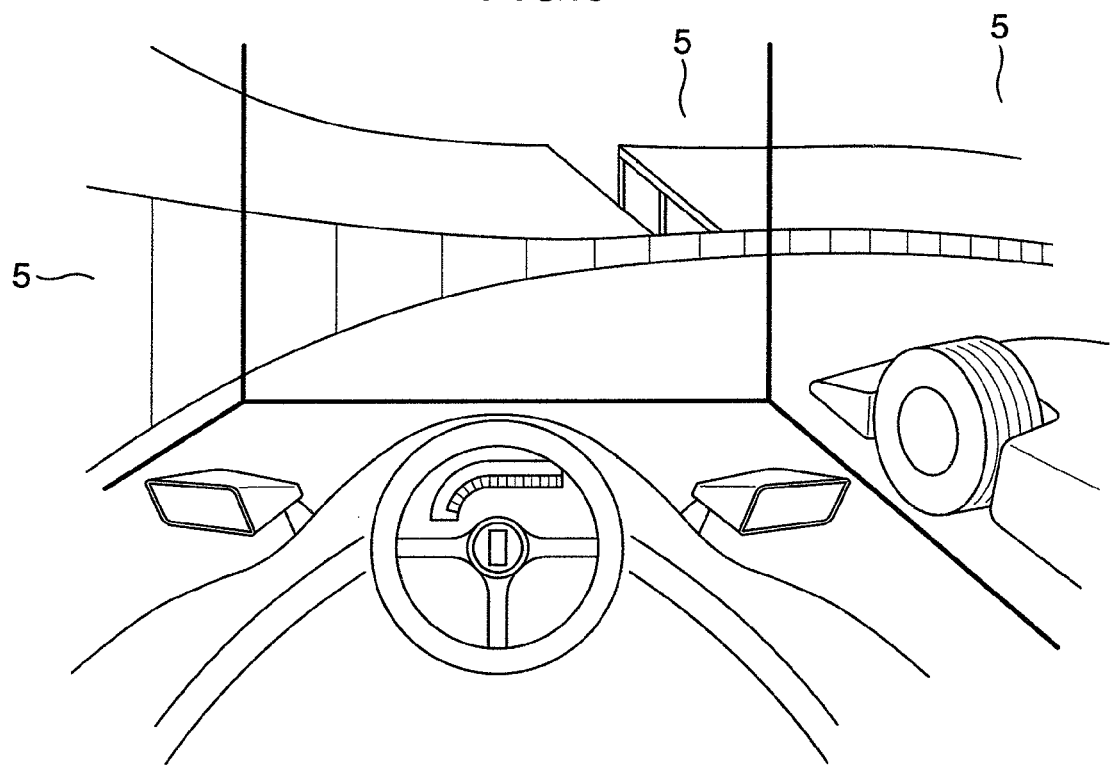
FIG. 9B is a view transversely showing a screen projected image as seen from an operator in the configuration of FIG. 9A.

FIGS. 9A and 9B show examples, in which the projection display system according to the invention is made use of in, for example, a game center and a simulation equipment where operation of an airplane, a racing car, etc. is experienced in a pseudo manner.

As shown in FIG. 9A, a plurality (three in this example) of screens 5, 5 are arranged in this example to surround a predetermined space (that is, arranged at an angle of substantially not more than 90 degrees to a projected surface of an adjacent screen) whereby a location (cockpit in this example) where an operator is positioned is displayed as booth 510 in a pseudo manner. In addition, the projection display units 100, respectively, are mounted above respective screens 5 defining a front and left and right image planes, which define the booth 510, to project images from above the screens as shown by arrows in the figure to realize a three-direction (three-dimensional) pseudo dynamic image in an ultra short focus (that is, substantially just under the screens 5), that is, in space-saving.

A pseudo projected image arranged conventionally only at the front can be simply magnified therearound, that is, developed left and right, so that a great improvement in realistic sensations is achieved. A new representation, which is impossible conventionally, is readily enabled such that when another car is displayed on the right screen 5 in the example of car racing shown in the figure, an operator recognizes a car, which is aligned laterally to run, or an enemy appears suddenly from laterally in a shooting game. While only the example, in which three screens 5, 5 surround a substantially square space, has been described, screens are increased in number to form a screen formed of a polyhedron or substantially curved surfaces (that is, arranged at an angle of not more than 180 degrees to a projection surface of an adjacent screen) to enable having images from the projection display units 100 projected thereonto.

While the above embodiments have been described mainly with respect to a projection display system being of a front type, the invention is not limited to such embodiments but can be adopted in a projection display system being of a rear projection type, in which case it is apparent to those skilled in the art that the screen described above should be made a so-called transmission type one.

The invention produces an excellent effect of enabling realizing a projection display system, in which a distance to a projected surface (screen) is made minimum with an increased angle of view to suppress distortion and aberration to project a projected image to thereby make the system favorable in performance, convenient, and excellent in use.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection display system comprising a projection display unit and a screen, the projection display unit projecting an image light onto a projection plane of the screen to display an image, wherein the projection display unit includes:

a light source;

an image display element;

a lighting optical system irradiating a beam of light from the light source on the image display element; and a projection optical system projecting the image light from the image display element toward the screen, the projection optical system including:

a lens group composed of a plurality of lens elements arranged in order toward the screen from the image display element and having at least one free-form surface rotationally asymmetrical with respect to an optical axis; and a reflecting mirror having a free-form reflecting surface rotationally asymmetrical with respect to the optical axis;

wherein the optical axis of the lens group is arranged so as to have a predetermined angle other than substantially zero degrees with respect to a normal line of the screen;

wherein at least two lens elements of the lens group have a surface with an optical axis which is eccentric so as to be shifted with respect to an optical axis of an adjacent lens element of the lens group; and wherein the projection display unit is arranged on a part of upper, lower, left or right side of the screen along one plane extending perpendicularly to the projection plane from the side.

2. The system according to claim 1, wherein the projection display unit is joined mechanically to the screen.

3. The system according to claim 2, wherein the screen is a portable screen which can be folded up.

4. The system according to claim 3, wherein the screen is provided on a part thereof with a portable handle.

5. The system according to claim 2, wherein the projection display unit is arranged substantially centrally of an upper side of the screen, and includes a mirror which reflects the image light from the projection display unit to lead the image light to the projection plane of the screen.

6. The system according to claim 2, wherein the projection display unit is arranged substantially centrally of an upper side of the screen, and wherein at least two or more projection display systems are arranged so that a projection plane of a screen of each projection display system forms not more than 180 degrees relative to a projection plane of an adjacent screen.

7. The system according to claim 6, wherein the projection display units project mutually different images onto the projection planes of adjacent screens.

8. The system according to claim 7, wherein the different images projected on the two or more screens composes one image as a whole.

9. The system according to claim 1, wherein plural projection display units are provided, and the projection display units are arranged in positions close to a side of the screen.

10. The system according to claim 1, wherein a pair of projection display units are provided, and the pair of projection display units arranged on the upper and lower or left and right sides of the screen project the same images so that the images are mutually overlapped.

11. The system according to claim 1, wherein a pair of projection display units are provided, and the pair of projection display units arranged on the upper and lower or left and right sides of the screen project the same image onto the projection plane of the screen so that the images are mutually overlapped.

12. The system according to claim 1, wherein a pair of projection display units are provided, and the pair of projection display units arranged on the upper and lower or left and right sides of the screen project mutually different images onto the projection plane of the screen.

13. The system according to claim 1, wherein a pair of projection display units are provided, and the pair of projection display units arranged on the upper and lower sides of the screen are arranged in plural in a horizontal direction.

14. The system according to claim 1, wherein a pair of projection display units are provided, and the pair of projection display units arranged on the left and right sides of the screen are arranged in plural in a vertical direction.

15. The system according to claim 1, wherein the reflecting mirror is arranged so that the projected image light reflected by the reflecting mirror is not interrupted by the lens group.

16. The system according to claim 1, wherein the screen is arranged with respect to the projection display unit so as to display the projected image on a front surface thereof.

17. The system according to claim 1, wherein at least one lens element of the at least two lens elements of the lens group having a surface which is eccentric has a surface of rotational symmetry.

18. The system according to claim 1, wherein the predetermined angle other than substantially zero degrees of the optical axis of the lens group with respect to the normal line of the screen is an oblique angle.

* * * * *